US006606366B2

United States Patent
Koiwai et al.

(10) Patent No.: US 6,606,366 B2
(45) Date of Patent: Aug. 12, 2003

(54) NUCLEAR POWER PLANT HAVING STEAM TURBINE CONTROLLER

(75) Inventors: Masatoshi Koiwai, Kanagawa-ken (JP); Yutaka Yokota, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/827,929

(22) Filed: Apr. 9, 2001

(65) Prior Publication Data

US 2003/0123599 A1 Jul. 3, 2003

(30) Foreign Application Priority Data

Apr. 10, 2000 (JP) .......................................... 2000-108622

(51) Int. Cl.[7] .................................................. G21C 7/32
(52) U.S. Cl. ......................................... 376/210; 376/211
(58) Field of Search ................................ 376/210, 211, 376/215; 60/662, 663

(56) References Cited

U.S. PATENT DOCUMENTS

| | | | | |
|---|---|---|---|---|
| 3,778,347 A | * | 12/1973 | Giras et al. | 376/217 |
| 3,931,500 A | * | 1/1976 | Berkebile et al. | 376/217 |
| 4,329,592 A | * | 5/1982 | Wagner et al. | 290/40 R |
| 4,357,803 A | * | 11/1982 | Dickenson | 60/662 |
| 4,372,125 A | * | 2/1983 | Dickenson | 60/660 |
| 4,554,788 A | * | 11/1985 | Hwang et al. | 60/646 |
| 5,268,939 A | * | 12/1993 | Tang et al. | 376/210 |
| 5,293,411 A | * | 3/1994 | Miyamoto et al. | 376/210 |
| 6,198,786 B1 | * | 3/2001 | Carroll et al. | 376/207 |

FOREIGN PATENT DOCUMENTS

| | | | | |
|---|---|---|---|---|
| GB | 2107403 A | * | 4/1983 | 290/40 R |
| JP | 54-123604 | | 9/1979 | |
| JP | 64-083198 | * | 3/1989 | 376/211 |

* cited by examiner

Primary Examiner—Michael J. Carone
Assistant Examiner—Daniel Matz
(74) Attorney, Agent, or Firm—Foley & Lardner

(57) ABSTRACT

There is provided a nuclear power plant having a steam turbine controller. The nuclear power plant includes a main steam supply system and a turbine by-pass system. The main steam supply system guides steam from heat generated by the nuclear reactor to a steam turbine. The turbine by-pass system is branched from the main steam supply system at a main steam header. A main steam control valve is equipped with the main steam supply system and adjusts steam pressure in the main steam supply system supplied to the steam turbine. A turbine by-pass valve is used to by-pass steam to the turbine by-pass system. A regulating controller generates first and second opening/closing signals for the main steam control valve and the turbine by-pass valve, and an ON-OFF controller generates a third opening/closing signal for the turbine by-pass valve. The third opening/closing signal has priority over the second opening/closing signal.

14 Claims, 20 Drawing Sheets

NUCLEAR POWER PLANT HAVING STEAM TURBINE CONTROLLER

BACKGROUND

1. Field of the Invention

The present invention relates to a nuclear power plant, and more specifically to a nuclear power plant capable of adjusting the position of a turbine by-pass valve based on the steam pressure generated in a nuclear reactor.

2. Description of the Related Art

FIG. 1 is a diagram showing a main steam system and a turbine by-pass system of a nuclear power plant.

A main steam supply system 01 is constituted such that steam generated in a nuclear reactor 1 is supplied to a steam turbine 8 via a main steam header 4, a main steam stop valve 5, and a main steam control valve (CV) 6, respectively.

Specifically, steam from the nuclear reactor 1 is supplied to the main steam header 4 disposed outside a primary containment vessel 3. The steam thus supplied to main steam header 4 then flows to the steam turbine 8 via the main steam stop valve 5 and the main steam control valve 6. The main steam stop valve 5 isolates steam in the steam turbine 8 in case of stopping operation thereof, and the main steam control valve 6 adjusts the flow rate of steam to the steam turbine 8. The steam from the nuclear reactor 1 rotates the steam turbine 8, and a generator 9 connected directly to the steam turbine 8 generates electric power.

Steam that passes through the steam turbine 8 is then guided to a condenser 10. Cooling water such as seawater enters the condenser 10, and a heat exchange is made between the cooling water and the steam. Steam thus cooled is condensed to water and is circulated back to the nuclear reactor 1.

A turbine by-pass steam supply system 02, independent from the main steam system 01, branches from the main steam header 4. The turbine by-pass system 02 guides steam from the main steam header 4 to the condenser 10 via the turbine by-pass valve.

In a regular operation mode of the nuclear power plant, steam pressure generated in the nuclear reactor 1, which is specifically pressure on the main steam header 4 detected by a main steam pressure detector 2 or pressure detected by a reactor dome pressure detector 11, is adjusted by the main steam control valve 6 in order to meet a predetermined pressure value. The turbine by-pass valve 7 is fully opened in this situation. Meanwhile, when the nuclear power plant is in a starting or a stopping mode, or when an accident happens to a power supply system, the position of the main steam control valve 6 restricted. In this situation, the turbine by-pass valve 7 adjusts the main steam pressure 2 in the main steam header 4.

Further, when a load is deprived, such as load isolation of the generator 9 and turbine trip, turbine-trip, or the like, both the main steam stop valve 5 and the main steam control valve 6 are closed rapidly, stopping the steam flow to the steam turbine 8. This causes an increase in the pressure in the nuclear reactor 1 and of the main steam. To relax this pressure, the turbine by-pass valve 7 rapidly opens and the main steam is bypassed to the condenser 10.

A conventional turbine controller for the nuclear power plant is explained referring to FIG. 2. A regulating controller in the steam turbine controller 12 controls the position of the main steam control valve 5 and the turbine by-pass valve 7.

Main steam pressure signals are output signals from the main steam pressure detector 2 connected to the main steam header 4 and enter the steam turbine controller 12. The signals thus entered are compared to the predetermined pressure value in a main steam pressure setter 23, and a pressure deviation signal 29 is carried out by a first pressure deviation calculating unit 24. Here, the pressure deviation signal 29 is entered into a pressure control calculating unit 25, and a pressure control signal 30, which is proportional to the pressure deviation signal 29, is input into a first low value selector 18 as a pressure control signal 30.

In the first low value selector 18, the pressure control signal 30 is compared to a velocity/load control signal from a speed/load control calculating unit 15, a load limit signal from a load limiter 16, and a maximum flow rate limit signal from a maximum discharge restriction unit 17, respectively. After the comparison, the first low value selector 18 chooses a minimum signal from among those signals and outputs the minimum signal as a valve position demand signal 26 of the main steam control valve 6.

Further, the pressure control signal 30 carried out by the pressure control calculating unit 25 and the valve position demand signal 26 of the main steam control valve 6 obtained by the first low value selector 18 are input into a first deviation calculating unit 20, and a deviation signal is calculated. The maximum discharge restriction signal carried out by the maximum discharge restriction unit 17 and the valve position demand signal 26 of the main steam control valve 6 obtained by the first low value selector 18 are input into a second deviation calculating unit 21, and a deviation signal is calculated.

The deviation signals from the first deviation calculating unit 20 and the second deviation calculating unit 21 are input into a second low value selector 22. These deviations are then compared therein, and the lower signal is chosen as a valve position demand signal 31 of the turbine by-pass valve 7.

The turbine by-pass valve position demand signal 31 output from the regulating controller 13 and the valve position demand signal 26 are entered into a valve position control unit 32 having an amplifier, and a deviation signal carried out by the valve position control unit 32 is entered into a servo valve 33. The servo valve 33 controls the valve position of the turbine by-pass valve 7 to a value required by the steam turbine controller 12, by adjusting the amount of oil in an oil cylinder 38 that operates turbine by-pass valve 7.

The oil cylinder 38 connects a fast acting solenoid valve 37; the fast acting solenoid valve 37 accepts a fast open acting demand to turbine by-pass valve 36 and makes turbine by-pass valve 7 realize a rapid valve-opening operation in an emergency as well as in a performance test. In the regular operation mode, the fast open acting demand to turbine by-pass valve 36 is not generated, and therefore, the oil cylinder 38 is controlled only by turbine by-pass valve 7. However, if the fast open acting demand to turbine by-pass valve 36 is generated due to detection of a power load unbalance such as a load isolation, the turbine by-pass valve 7 is fully opened regardless of the control signal from the servo valve 33. Usually, a plurality of turbine by-pass valves 7 are equipped in a plant, however, only the valve which accepted the fast open acting demand to turbine by-pass valve 36 can be fully opened.

For reliability reasons, the main steam pressure detector 2, the regulating controller 13 and the like are multiplexed. Therefore, FIG. 2 shows the case where the triplex main steam pressure detectors 2 and the triplex regulating controller 13 are arranged. The medium value among the output signal from the triplex main steam pressure detectors 2 are chosen by the first medium value selector 27, and each of the triplex regulating controllers 13 operates the pressure control signal 30 and the valve position control unit 32 for the plant control.

Further, the number of turbine by-pass valves 7 varies from each nuclear power plant. The valve position control unit 32, the servo valve 33, the fast acting solenoid valve 37, and the oil cylinder 38 are identical in each turbine by-pass valve 7, and therefore, only one turbine by-pass valve 7 and the peripherals are illustrated in FIG. 2.

In a nuclear power plant having multiplexed regulating controllers 13, if one regulating controller 13 has a problem or an unusual condition in its regular operating mode, the other regulating controllers can compensate the unusual condition and maintain the operation. Moreover, if the unusual condition is found, the system can recover from any problems. However, if there is an unusual condition in hardware or software that affects all the regulating controllers 13 commonly, such unusual condition may not be found and the operation may continue.

If an unusual condition over plural regulating controllers happens, the ability to adjust the position of the turbine by-pass valve 7 is lost, and a turbine trip occurs before the unusual condition is detected, the turbine by-pass valve 7, which is usually opened when the main steam stop valve 5 is fully closed, may not operate. Because the turbine by-pass valve 7 keeps closing in this situation, pressure inside the nuclear reactor 1 is rapidly increased and will be in critical thermal condition.

The present invention has been made in view of the above-mentioned circumstances and is intended to solve the above-mentioned problems. In particular, the purpose of the present invention is to provide a steam turbine controller for a nuclear power plant capable of avoiding a rapid increase in pressure in the nuclear reactor even if the function of the turbine by-pass valve is lost.

SUMMARY OF THE INVENTION

The present invention provides a nuclear power plant having a nuclear reactor, including: a first steam supply system connected between the nuclear reactor and a steam turbine, a second steam supply system branched from the first steam supply system and connected downstream of the steam turbine, a first valve in the first steam supply system for adjusting steam pressure to the steam turbine, a second valve in the second steam supply system for adjusting branched steam pressure, a first controller that generates a first opening/closing signal for the first valve and a second opening/closing signal for the second valve, and a second controller that generates a third opening/closing signal for the second valve, the third opening/closing signal having priority over the second opening/closing signal.

Here, the third signal may be generated if the second valve is closed and the pressure in the steam turbine decreases. The third signal may include an opening signal for the second valve.

Further, the third signal may be generated if the second valve is closed within a predetermined time period after receiving the second signal. The third signal may be released if the second valve is opened within a predetermined time period after receiving the third signal.

The second valve may be multiplexed, and each second valve may accept the second signal and the third signal.

Furthermore, the third signal may be released if the steam pressure from the nuclear reactor is in a predetermined value. The third signal may be generated only once.

The third signal may be generated at least when the plant is not in regular operating mode. The third signal may act to avoid closing both the first valve and the second valve.

BRIEF DESCRIPTION OF DRAWINGS

The accompanying drawings, which are incorporated in and constitute a part of this specification, illustrate several preferred embodiments of the invention and, together with the description, serve to explain the principles of the invention.

DESCRIPTION OF PREFERRED EMBODIMENTS

Preferred embodiments of a steam turbine controller for a nuclear power plant of the present invention will now be specifically described in more detail with reference to the accompanying drawings. Wherever possible, the same reference numbers will be used throughout the drawings to refer to the same or like parts.

Figure 1:
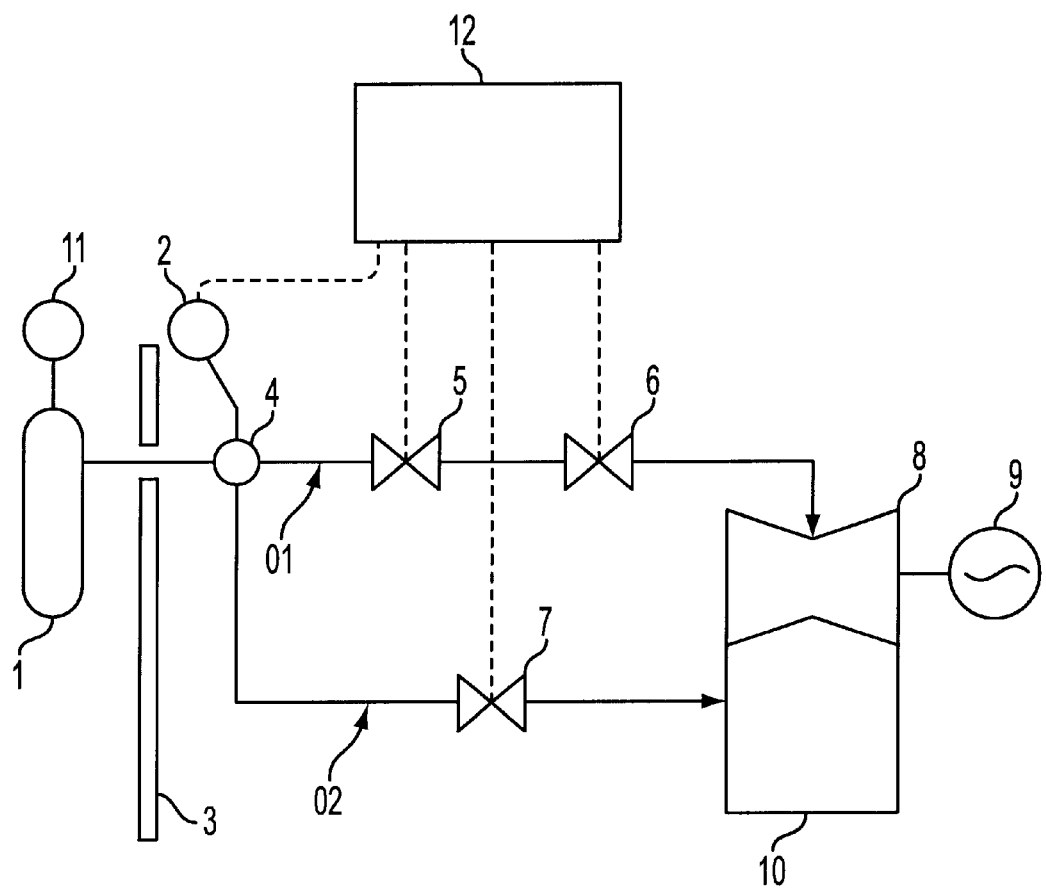
FIG. 1 is a diagram showing a main steam system and a turbine by-pass system of a nuclear power plant.
Figure 2:
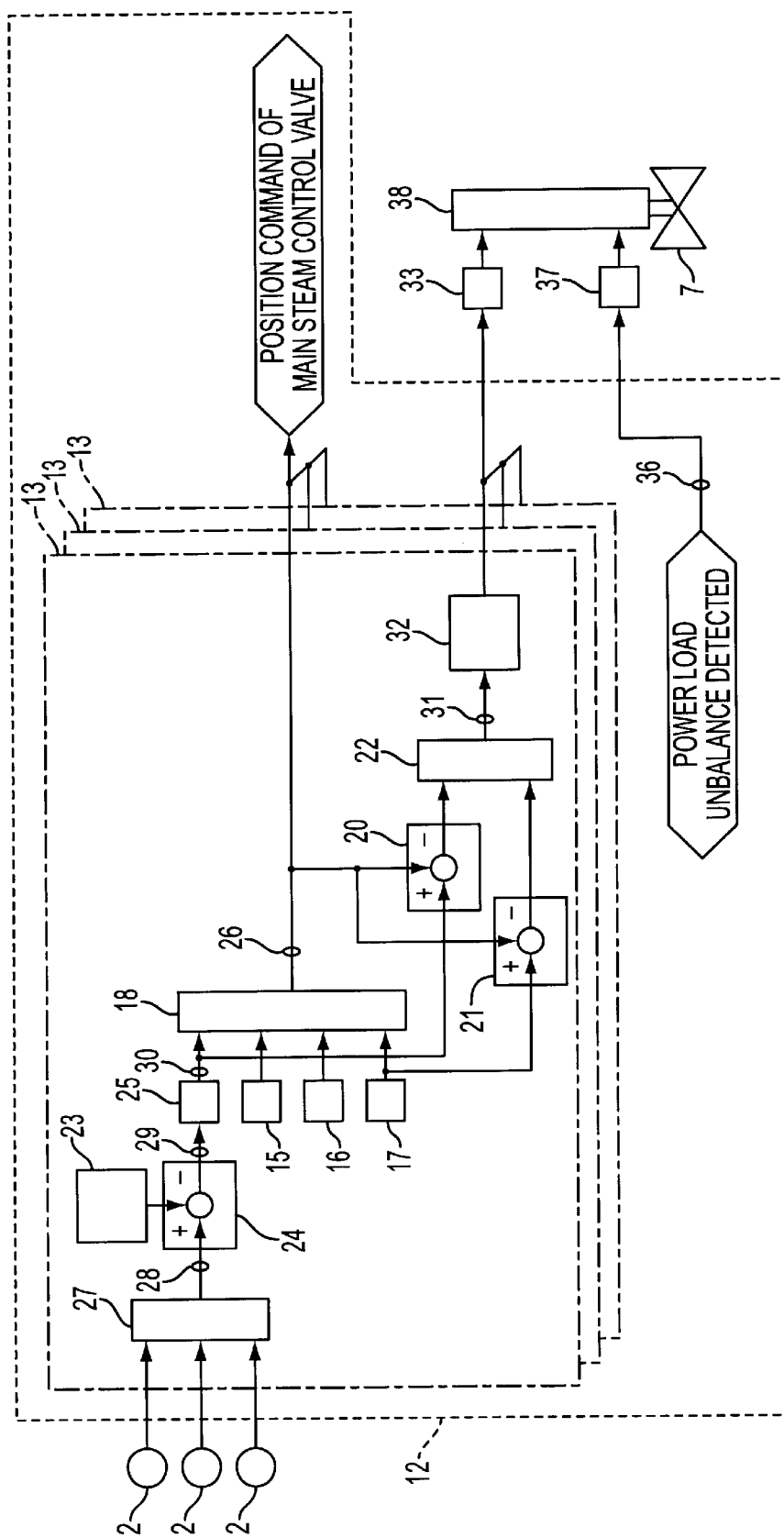
FIG. 2 is a block diagram showing a steam turbine controller for a nuclear power plant.
Figure 3:
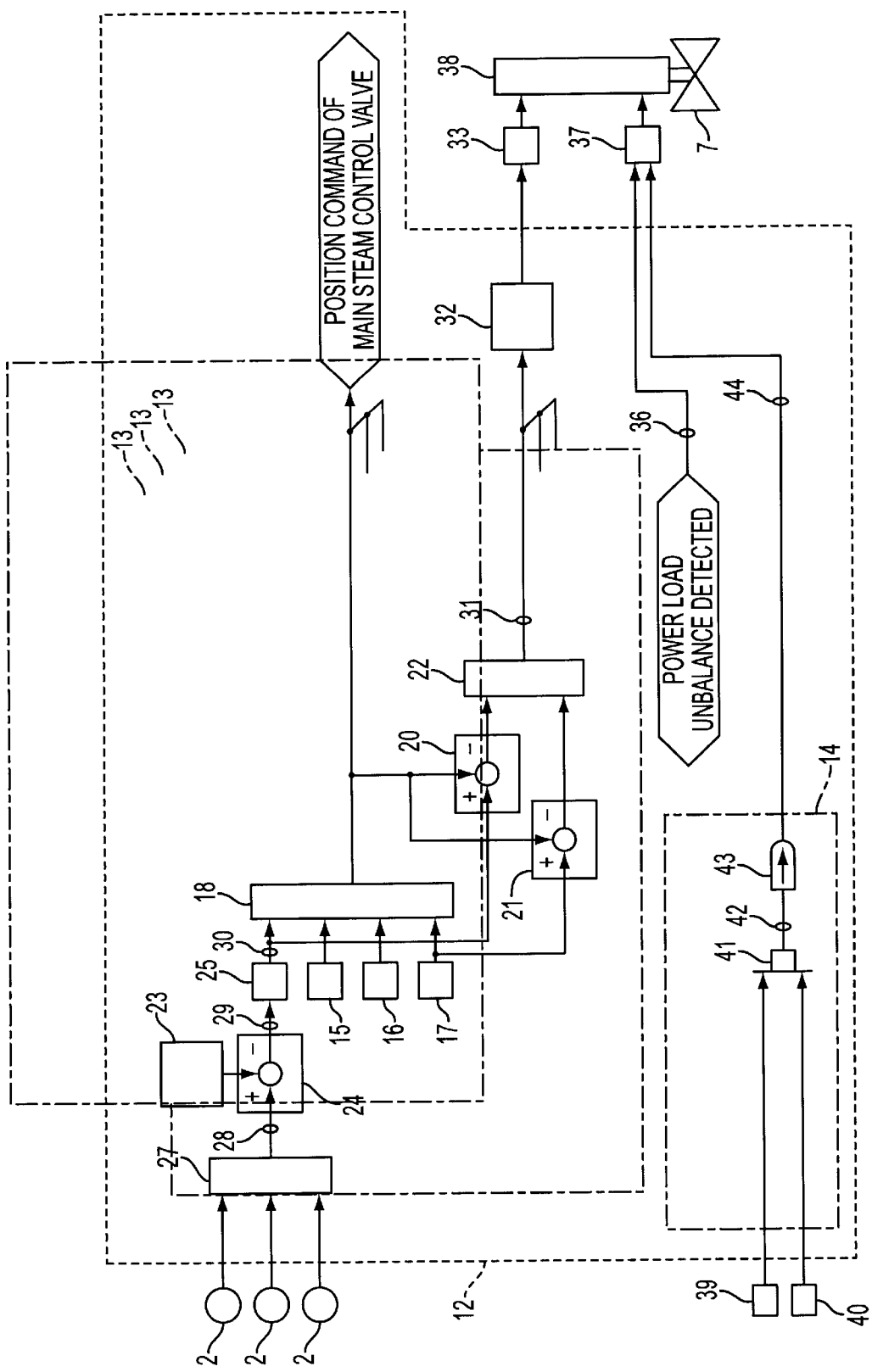
FIG. 3 is a block diagram showing a steam turbine controller for a nuclear power plant according to a first embodiment of the present invention.

FIG. 3 is a block diagram showing a steam turbine controller for a nuclear power plant according to a first embodiment of the present invention.

In first embodiment, an element capable of controlling opening/closing such as an ON-OFF controller 14 can operate the turbine by-pass valve 7 even if the regulating controller 13 malfunctions. The ON-OFF controller 14 rapidly opens the fast acting solenoid valve 37 independent from the regulating controller 13 that controls the position of the main steam control valve 6 and the turbine by-pass valve 7.

The ON-OFF controller 14 includes an AND circuit 41 and an ON delay timer 43. The AND circuit 41 receives a detection signal indicating that the turbine by-pass valve 7 is fully closed from a turbine by-pass valve fully closed position detector 39 and a detection signal indicating that the steam turbine 8 is tripped from a turbine trip detector 40. The AND circuit 41 outputs a turbine by-pass valve non-operation detection signal 42 when both detection signals are recognized.

Figure 4A:
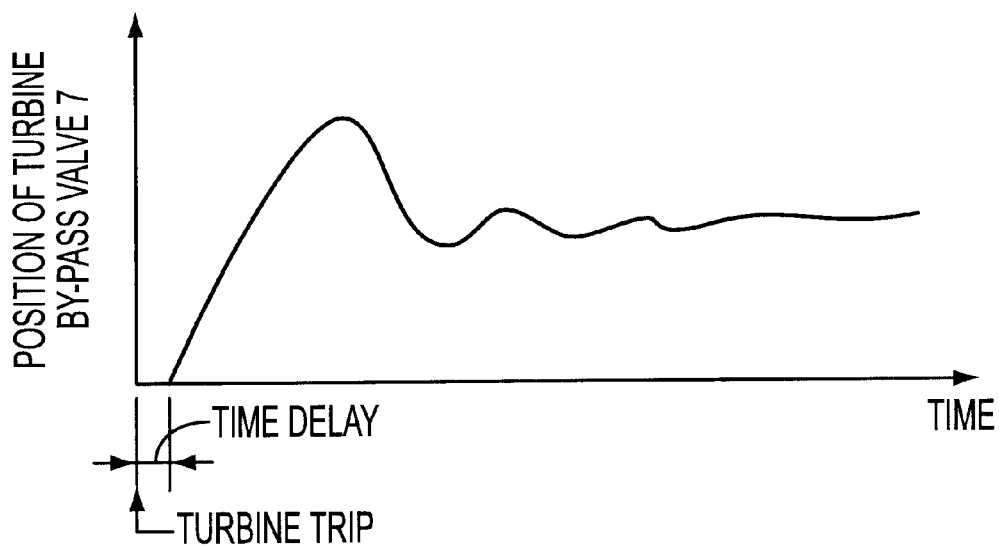
FIGS. 4A and 4B are graphs showing function of the ON-OFF controller 14.
Figure 4B:
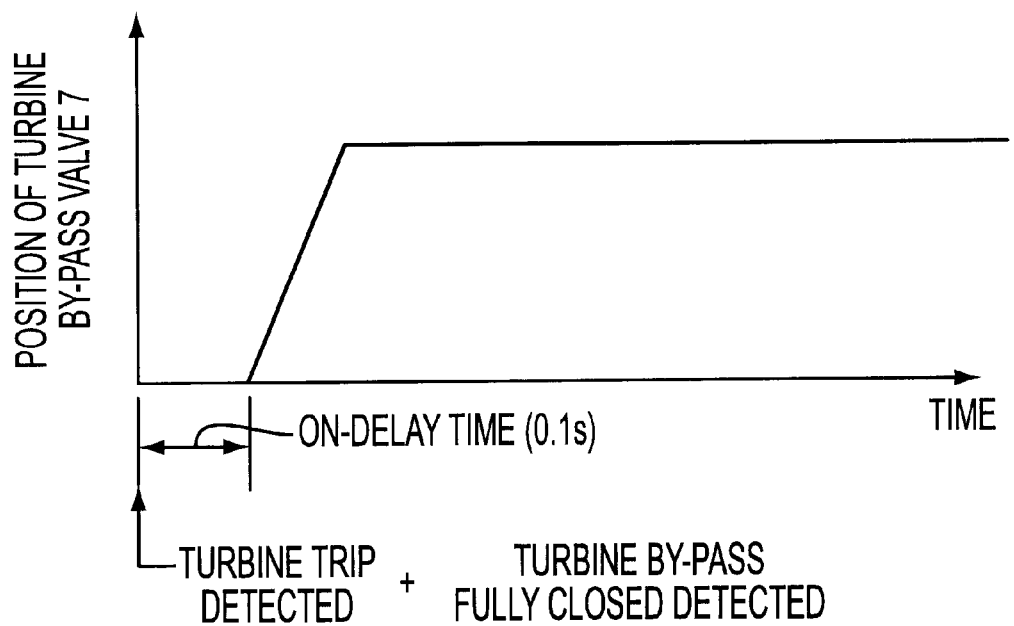

FIGS. 4A and 4B are graphs showing functions of the ON-OFF controller 14; that is, these figures are to explain advantages of the first embodiment of the present invention. As shown in FIG. 4A, the ON delay timer 43 outputs turbine by-pass valve fully opened demand signal 44 when the turbine by-pass valve non-operation detection signal 42 from the AND circuit 41 is entered during a certain period (ON delay time T) such as 0.1 second for example. Thus, the ON delay timer 43 can output the turbine by-pass valve fully opened demand signal 44 to the fast acting solenoid valve 37.

If a turbine trip occurs while the regulating controller 13 operates normally, the turbine by-pass valve 7 can be controlled to open. This usually employs a time delay; it requires a time period from the generation of a detection signal from the turbine trip detector 40 to the opening operation of the turbine by-pass valve 7, as shown in FIG. 4A. Considering this time delay, the ON delay time T generated by the ON delay timer 43 can operate the turbine by-pass valve 7 effectively by providing a proper turbine by-pass valve fully opened demand signal 44 carried out from the turbine by-pass valve non-operation detection signal 42.

According to the first embodiment explained above, the second control based on the on/off signal using the ON-OFF controller 14 as well as the first control based on the pressure signal using the regulating controller 13 control the turbine by-pass valve 7. Thereby, the ON-OFF controller 14 can drive the fast acting solenoid valve 37 even if the regulating controller 13 has a problem such as a malfunction, and rapid increase of pressure in the nuclear reactor 1 can be avoided by ensuring opening operation of the turbine by-pass valve 7.

A single ON-OFF controller 14 is employed in the first embodiment; however, the ON-OFF controller 14 can be multiplexed and a single turbine by-pass fully opened demand signal 44 can be chosen from among the multiple output signals. Specifically, the output signals from the turbine by-pass valve fully closed position detector 39 and the turbine trip detector 40 are input to the plural ON-OFF controllers 14, and that the turbine by-pass valve fully opened demand signal 44 is output if at least one of the plural ON-OFF controllers 14 accepts a detection signals from both the turbine by-pass valve fully closed position detector 39 and the turbine trip detector 40.

Furthermore, the turbine by-pass valve fully opened demand signal 44 is used to control the fast acting solenoid valve 37 in FIG. 3. However, the turbine by-pass valve fully opened demand signal 44 can be applied to control the servo valve 33 instead.

Figure 5:
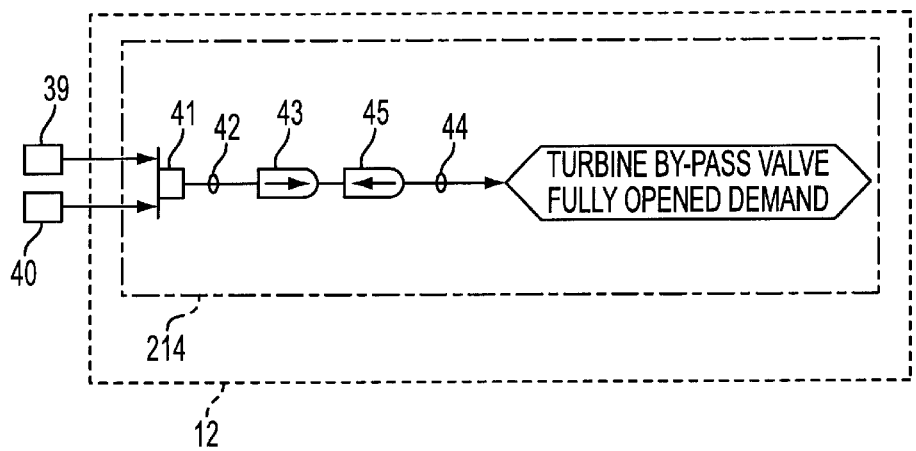
FIG. 5 is a block diagram showing an ON-OFF controller in the steam turbine controller for a nuclear power plant according to a second embodiment of the present invention.
Figure 6:
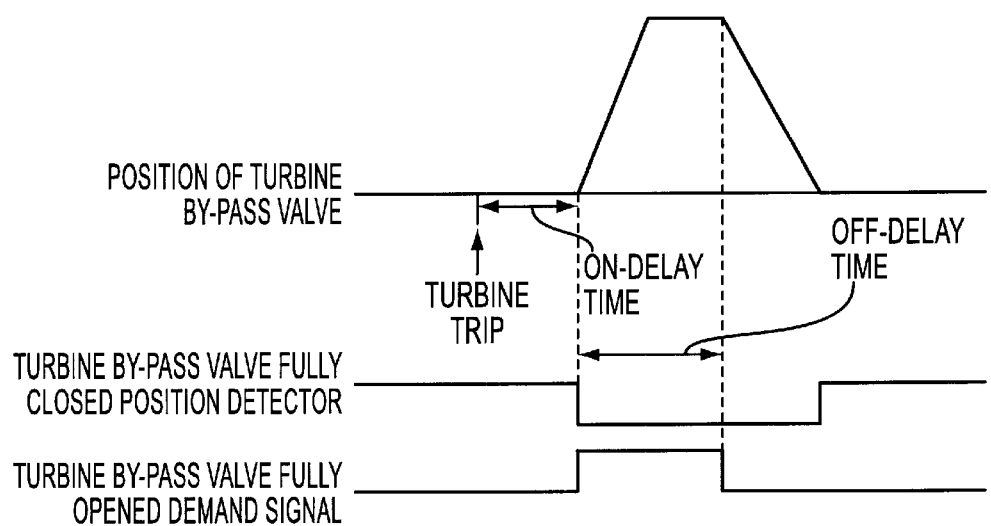
FIG. 6 is a timing chart for explaining advantages of the second embodiment.

FIG. 5 is a block diagram showing an ON-OFF controller 214 in the steam turbine controller for a nuclear power plant according to a second embodiment of the present invention, and FIG. 6 is a timing chart for explaining advantages of the second embodiment. An ON-OFF controller 214 employed in the second embodiment is constituted such that an OFF delay timer 45 is disposed downstream of the ON delay timer 43 of the ON-OFF controller 14 shown in FIG. 3. This makes it possible to release the fully opened command based on the turbine by-pass valve fully opened demand signal 44 after a predetermined period from the opening operation of the turbine by-pass valve 7. The other structures are identical to those explained in the first embodiment.

As shown in FIGS. 5 and 6, when fully opened condition of the turbine by-pass valve 7 is detected by the turbine by-pass valve fully closed position detector 39, the turbine by-pass valve non-operation detection signal 42 is output from the AND circuit 41. The turbine by-pass valve non-operation detection signal 42 is entered to the OFF delay timer 45 after a certain succession period, that is, after the on-delay period passes set in the ON delay timer 43. If the off-delay period set in the OFF delay timer 45 passes, the turbine by-pass valve fully opened demand signal 44 is output from the OFF delay timer 45. Thereby, the fully opened command based on the turbine by-pass valve fully opened demand signal 44 is released, restraining repeated opening/closing operations of the turbine by-pass valve 7 caused by the turbine by-pass valve non-operation detection signal 42 detecting continuously.

According to the present embodiment, if a turbine trip is detected by the turbine trip detector 40 and the fully closed condition of the turbine by-pass valve 7 is detected by the turbine by-pass valve fully closed position detector 39, then the turbine by-pass valve non-operation detection signal 42 is output. The turbine by-pass valve non-operation detection signal 42 is reset when the turbine by-pass valve 7 is opened. That is, opening/closing operations caused by the continuous detection of output signals from the turbine by-pass valve fully closed position detector 39 is restrained while the turbine by-pass valve 7 is closing. Consequently, pressure inside the nuclear reactor 1 can be restrained based on the first opening operation of the turbine by-pass valve 7.

Figure 7:
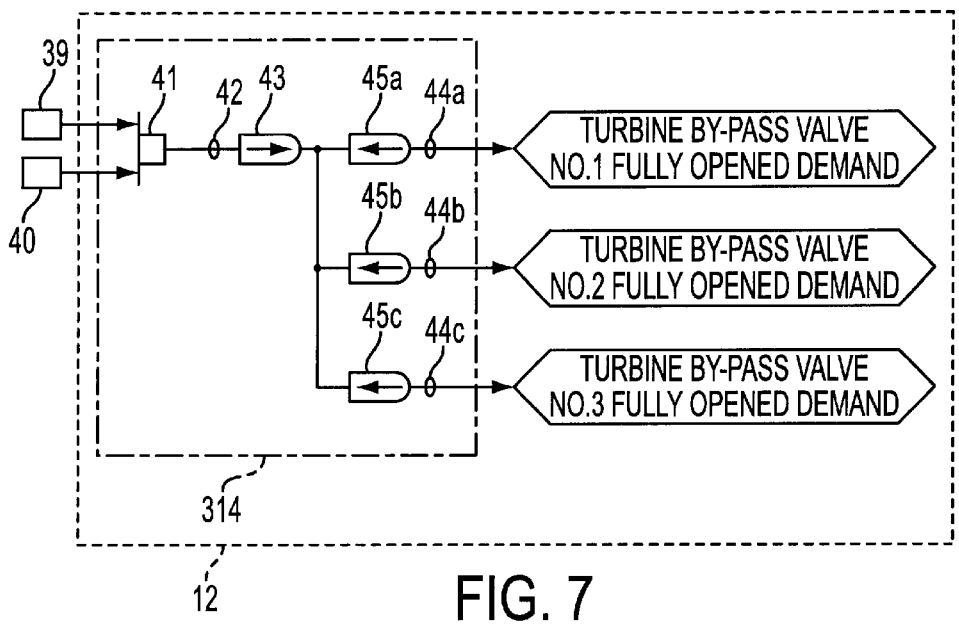
FIG. 7 is a block diagram showing an ON-OFF controller in the steam turbine controller for a nuclear power plant according to a third embodiment of the present invention.
Figure 8:
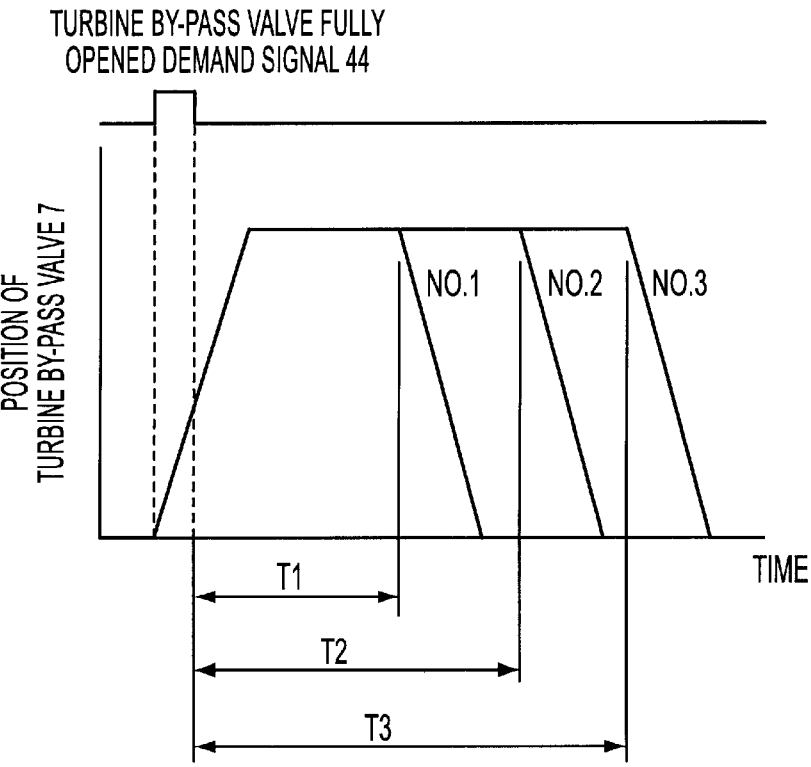
FIG. 8 is a timing chart for explaining advantages of the third embodiment.

FIG. 7 is a block diagram showing an ON-OFF controller 314 in the steam turbine controller for a nuclear power plant according to a third embodiment of the present invention, and FIG. 8 is a timing chart for explaining advantages of the third embodiment.

In the third embodiment, an ON-OFF controller 314 is employed corresponding to the plural turbine by-pass valves 7 such as three for example. On each turbine by-pass valve 7, an OFF delay timer 45a having off-delay time T1, an OFF delay timer 45b having off-delay time T2, and an OFF delay timer 45c having off-delay time T3 are connected, respectively. On the upstream side of these OFF delay timers 45a, 45b and 45c, there is connected the AND circuit 41 via the ON delay timer similarly to FIG. 5, and the AND circuit 41 is capable of inputting detection signals obtained by the turbine by-pass valve fully closed position detector 39 and the turbine trip detector 40. The other structures are identical to those explained in the first embodiment.

According to the present embodiment, if a turbine trip is detected by the turbine trip detector 40, and the fully closed condition of the turbine by-pass valve 7 is detected by the turbine by-pass valve fully closed position detector 39, then the turbine by-pass valve non-operation detection signal 42 is output from the AND circuit 41. This turbine by-pass valve non-operation detection signal 42 is input to the ON delay timer 43. If an output is made continuously during a certain time period, turbine by-pass valve fully opened demand signals 44a, 44b and 44c are generated corresponding to each turbine by-pass valve 7 using OFF delay timers 45a, 45b and 45c.

Accordingly, after all the turbine by-pass valve fully opened demand signals 44a, 44b and 44c are generated, commands based on the turbine by-pass valve fully opened demand signals 44a, 44b and 44c are released shortly and all the turbine by-pass valves 7 are closed once. Thereby, it can be restrained that the turbine by-pass valves 7 repeat opening/closing operations caused by the continuous detection of the turbine by-pass valve non-operation detection signal 42.

According to the present embodiment, after the opening operations of the turbine by-pass valves 7, pressure build-up inside the nuclear reactor 1 can be restrained by closing the turbine by-pass valves 7. Consequently, pressure inside the nuclear reactor 1 can be restrained based on the first opening operation of the turbine by-pass valves 7.

Note that pressure inside the nuclear reactor 1 can be recovered by adjusting parameters of the OFF delay timers 45a, 45b and 45c connected to corresponding turbine by-pass valve 7 in this embodiment. Therefore, unique parameters can be set for individual turbine by-pass valves 7 so as to restrain the pressure increase.

Figure 9:
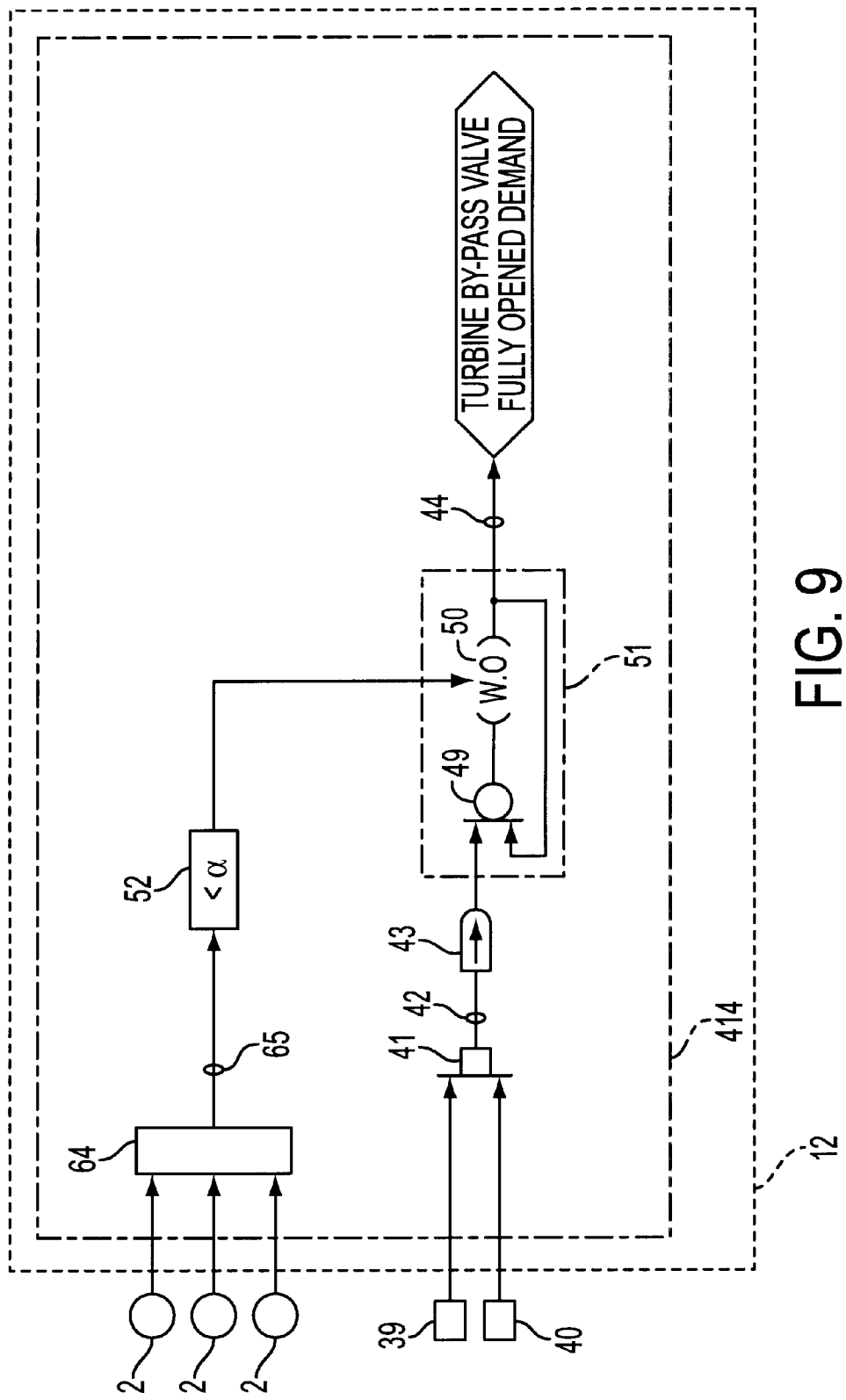
FIG. 9 is a block diagram showing an ON-OFF controller in the steam turbine controller for a nuclear power plant according to a fourth embodiment of the present invention.
Figure 10:
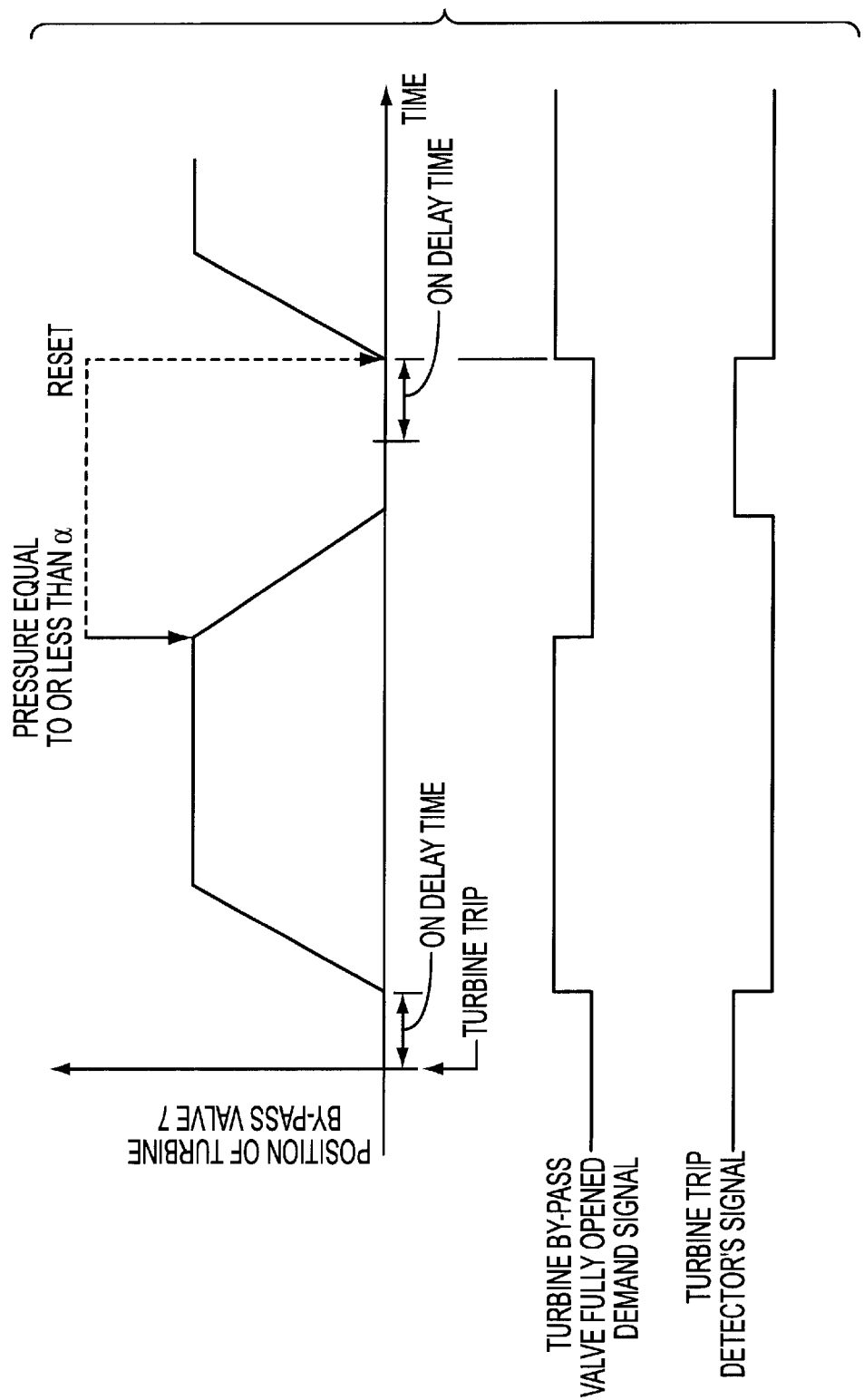
FIG. 10 is a timing chart for explaining advantages of the fourth embodiment.

FIG. 9 is a block diagram showing an ON-OFF controller 414 in the steam turbine controller for a nuclear power plant according to a fourth embodiment of the present invention, and FIG. 10 is a timing chart for explaining advantages of the fourth embodiment.

In the fourth embodiment, an ON-OFF controller 414, which includes a self-holding circuit 51, and a signal decision unit such as a pressure detector 52 for example are included in the ON-OFF controller 14 shown in FIG. 3. The self-holding circuit 51 includes an OR circuit 49 and a wipe out circuit 50 capable of calculating "NOT" and "AND" and is connected to the downstream of the ON delay timer 43. The pressure detector 52 inputs a second main steam pressure signal 65, which is chosen by a second medium value selector 64 as the medium value among signals from the main steam pressure detector 2, and a release command based on the turbine by-pass valve fully opened demand signal 44 by considering the detection signal from the pressure detector 52. The other structures are identical to those explained in the first embodiment.

In the system as constituted above, if the detection of the fully opened condition of the turbine by-pass valve 7 is made using turbine by-pass valve fully closed position detector 39 as well as the detection of the turbine trip condition, the turbine by-pass valve non-operation detection signal 42 is output from the AND circuit 41. The turbine by-pass valve non-.operation detection signal 42 is input to a self-holding circuit 51 via the ON delay timer 43. The turbine by-pass valve fully opened demand signal 44 is held by the self-holding circuit 51 and is released by a release signal from the pressure detector 52 when the pressure detector 52 detects the main steam pressure signal 65 to be equal or less than a predetermined value ($\alpha$). The pressure detector 52 is employed for the reason such that pressure inside the nuclear reactor 1 is adjusted to an acceptable value when the turbine by-pass valve 7 is opened and the pressure inside the nuclear reactor 1 is decreased.

According to the fourth embodiment, if the main steam pressure signal 65 is depressed to a certain value after suppressing a pressure peak of the main steam caused by a turbine trip, the fully opened turbine by-pass valve 7 can be reset automatically.

The main steam pressure detector 2 is preferably multiplexed for increased reliability. Therefore, detection signals from the triplex main steam pressure detector 2 are input to the ON-OFF controller 414, and the medium value is chosen by the second medium value selector 64. The second main steam pressure signal 65 obtained by the second medium value selector 65 is used as a release signal for the self-holding circuit 51.

Figure 11:
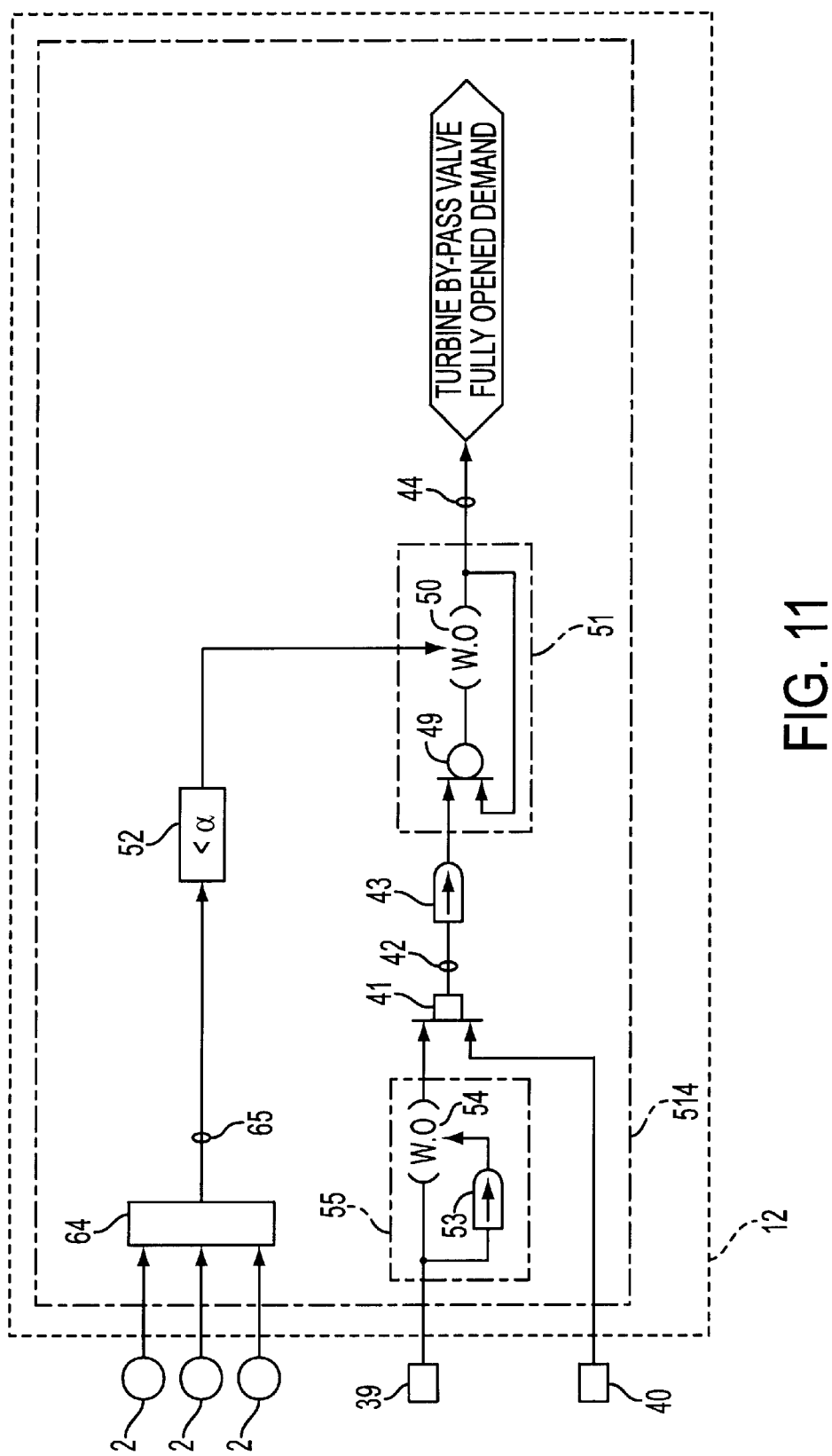
FIG. 11 is a block diagram showing an ON-OFF controller in the steam turbine controller for a nuclear power plant according to a fifth embodiment of the present invention.
Figure 12:
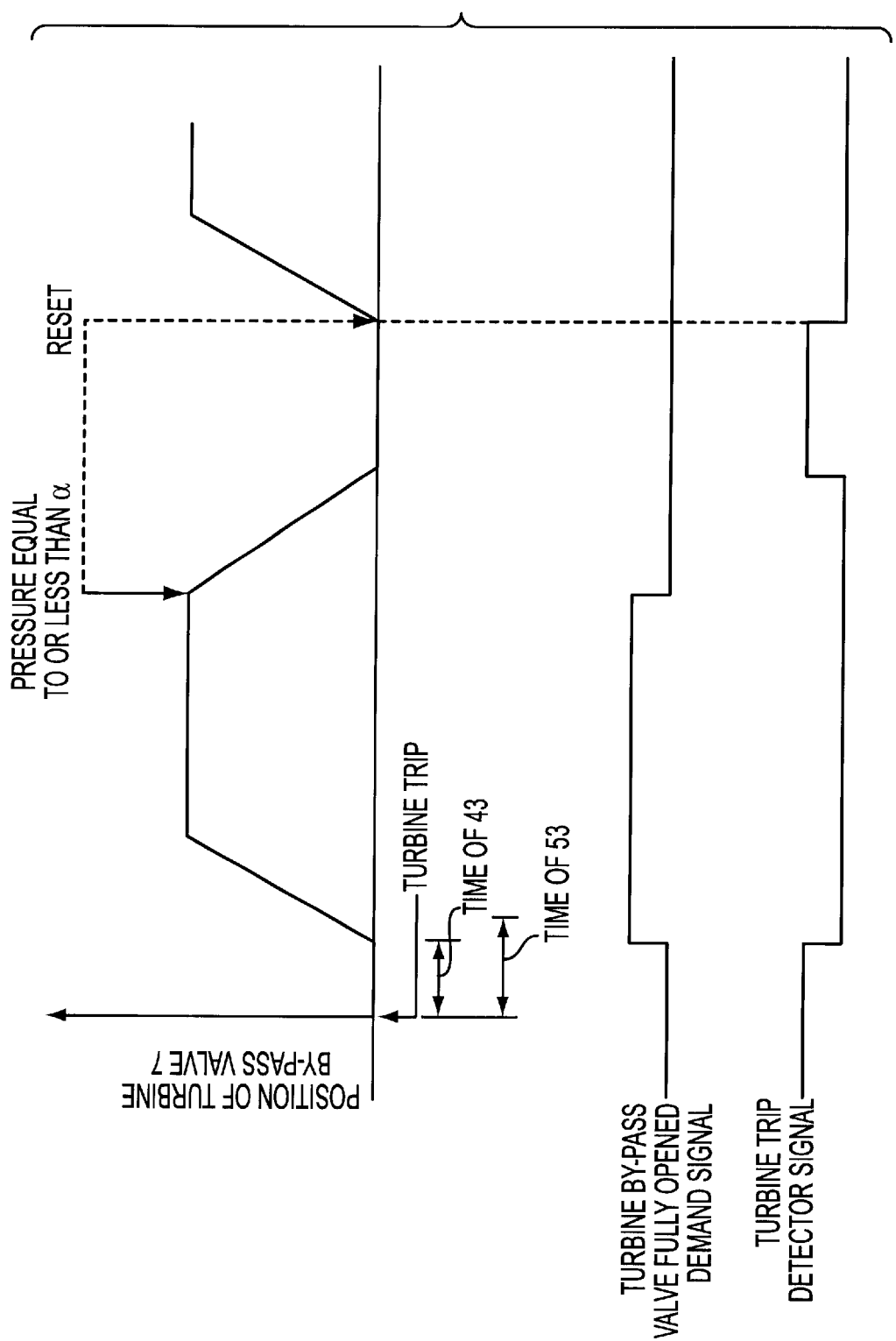
FIG. 12 is a timing chart for explaining advantages of the fifth embodiment.

FIG. 11 is a block diagram showing an ON-OFF controller 514 in the steam turbine controller for a nuclear power plant according to a fifth embodiment of the present invention, and FIG. 12 is a timing chart for explaining advantages of the fifth embodiment. In the present embodiment, a one-shot circuit 55 receives a detection signal from the turbine by-pass valve fully closed position detector 39 and outputs a processed signal to AND circuit 41. The one-shot circuit 55 includes a wipe out circuit 54 having a NOT circuit and an AND circuit and an ON delay timer 53 disposed parallel to the wipe out circuit 54. The other structures are identical to those explained in the first embodiment.

By employing the one-shot circuit 55 thus constituted, the continuous opening/closing operation of the turbine by-pass valve 7 caused by the valid turbine by-pass valve fully opened demand signal 44 is restrained even if the main steam pressure signal 65 is decreased. Further, the turbine by-pass valve fully opened demand signal 44 is reset whereby the turbine by-pass valve 7 is fully opened. Consequently, the system can be operated only by the turbine by-pass valve fully closed detection signal 42 at first.

According to the fifth embodiment, the continuous opening/closing operation of the turbine by-pass valve 7, such that the turbine by-pass valve 7 is fully opened and the command from the turbine by-pass valve fully opened demand signal 44 is released and such that the turbine by-pass valve 7 is fully closed and the command from the turbine by-pass valve fully opened demand signal 44 is effective, can be restrained.

Figure 13:
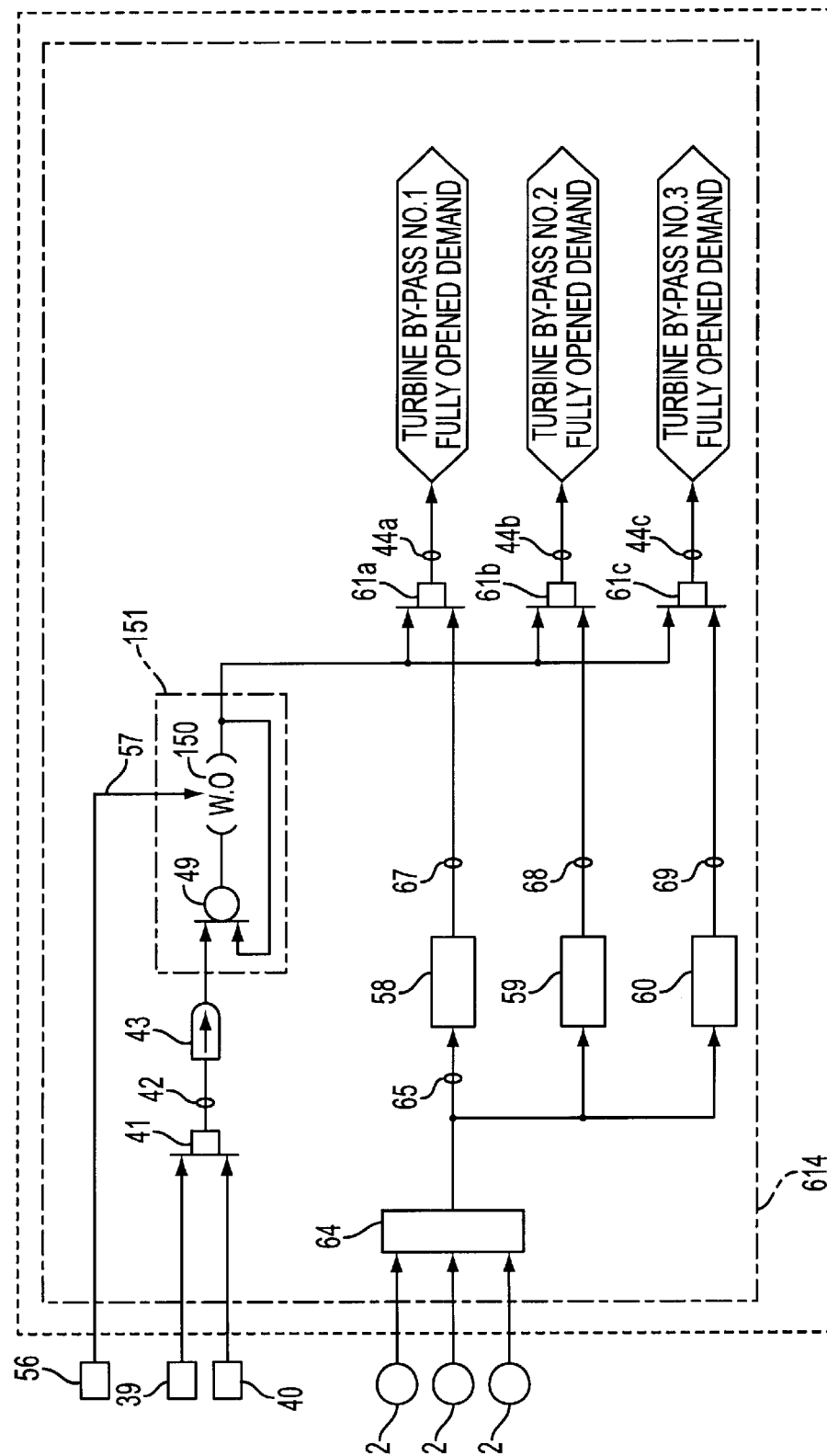
FIG. 13 is a block diagram showing an ON-OFF controller in the steam turbine controller for a nuclear power plant according to a sixth embodiment of the present invention.
Figure 14:
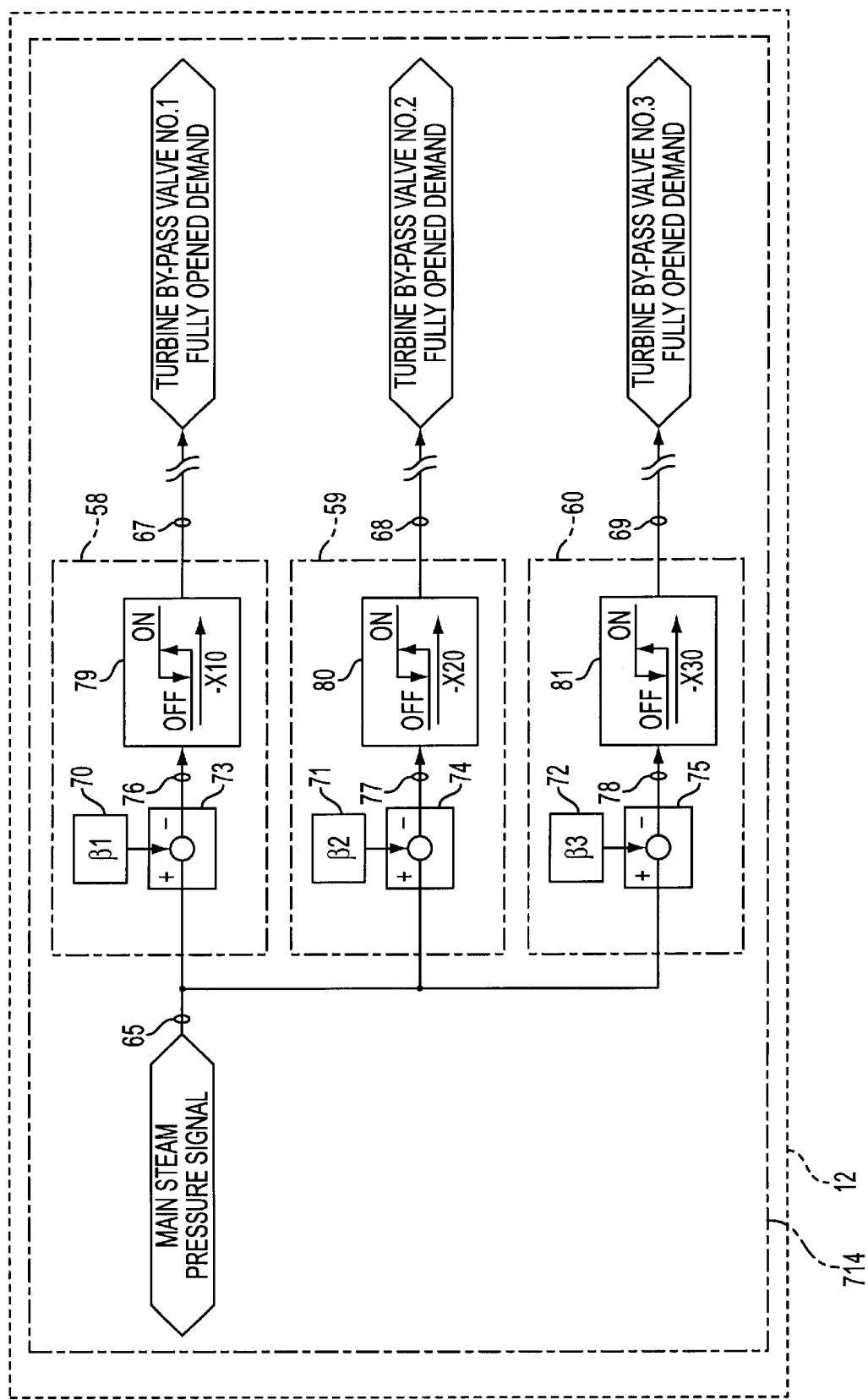
FIG. 14 is a block diagram showing signal decision units such as pressure detectors in FIG. 13.

FIG. 13 is a block diagram showing an ON-OFF controller 614 in the steam turbine controller for a nuclear power plant according to a sixth embodiment of the present invention, and FIG. 14 is a block diagram showing signal decision units such as pressure detectors 58, 59 and 60 in FIG. 13. In the sixth embodiment, a plurality of turbine by-pass valves 7 such as three for example is employed, and an ON-OFF controller 614 for controlling the turbine by-pass valves 7 is constituted as explained below.

The ON-OFF controller 614 includes a second medium value selector 64, three pressure detectors 58, 59, and 60, an AND circuit 41, an ON delay timer 43, an OR circuit 49, a self-holding circuit 151, and three AND circuits 61a, 61b and 61c.

The second medium value selector 64 receives detection signals from the main steam pressure detectors 2, and chooses the medium value for output. There may be, for example, three pressure detectors 2. The pressure detectors 58, 59 and 60 are used as signal decision units and detect that the main steam pressure signal 65 is equal to or more than a predetermined value (β) and thereby output detection signals 67, 68 and 69. The AND circuit 41 receives the turbine by-pass valve fully closed detection signal detected by the turbine by-pass valve fully closed position detector 39 and the turbine trip detection signal detected by the turbine trip detector 40, and outputs a turbine by-pass valve non-operation detection signal 42 when both the turbine by-pass valve fully closed detection signal and the turbine by-pass valve non-operation detection signals are detected. The ON delay timer 43 receives the turbine by-pass valve non-operation detection signal and outputs a signal to the OR circuit 49 after a certain time period (ON delay time). The self-holding circuit 151 includes a wipe out circuit 150 that carries out a "NOT" and an "AND" operation. Each of the AND circuits 61a, 61b, and 61c receives both the output signal from the self-holding circuit 151 and the pressure detection signal 68, 69 or 70, and when both signals are detected, outputs a turbine by-pass valve fully opened demand signal 44a, 44b or 44c. The other structures are identical to those explained in the first embodiment.

As shown in FIG. 14, the pressure detector 58 includes a turbine by-pass valve pressure deviation calculating unit 73 that receives an output signal from a turbine by-pass valve pressure setter 70 and the main steam pressure signal 65 to calculate a pressure deviation signal 76, and a turbine by-pass valve pressure comparator 79 that receives the pressure deviation signal 76 and compares it with a predetermined value (β1) thereby outputting the result as a detection signal 67.

The pressure detector 59 and the pressure detector 60 have the same basic structure as the pressure detector 58 in the present embodiment.

According to the sixth embodiment, the system can detect a fully opened condition when the turbine trip happens, and can detect if the main steam pressure is equal to or more than a predetermined value (β) as to each turbine by-pass valve 7. The system thus outputs a fully opened demand signal to each turbine by-pass valve 7. Therefore, unnecessary pressure control can be avoided by opening and closing required valves considering pressure increase and decrease thereof, and the valves can be controlled similarly to a regulating control depend on a pressure deviation signal.

Further, as shown in FIG. 13, a self-holding circuit 151 accepts a manual reset operation signal 57 from a manual reset operation means 56, and the commands to the turbine by-pass valves 7 can be released by inputting the manual reset operation signal 57 to the wipe out circuit 50.

Figure 15:
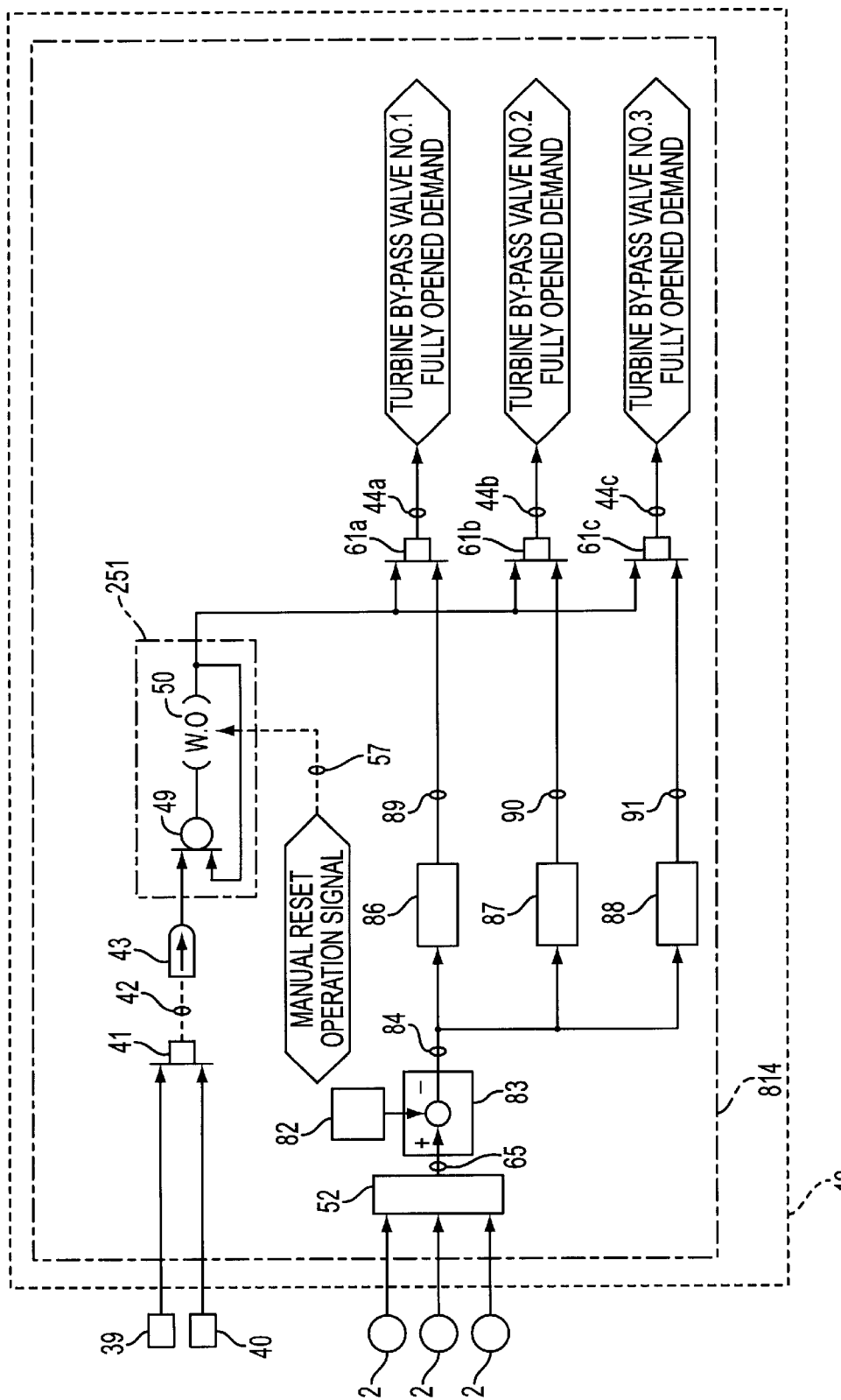
FIG. 15 is a block diagram showing an ON-OFF controller in the steam turbine controller for a nuclear power plant according to a seventh embodiment of the present invention.
Figure 16:
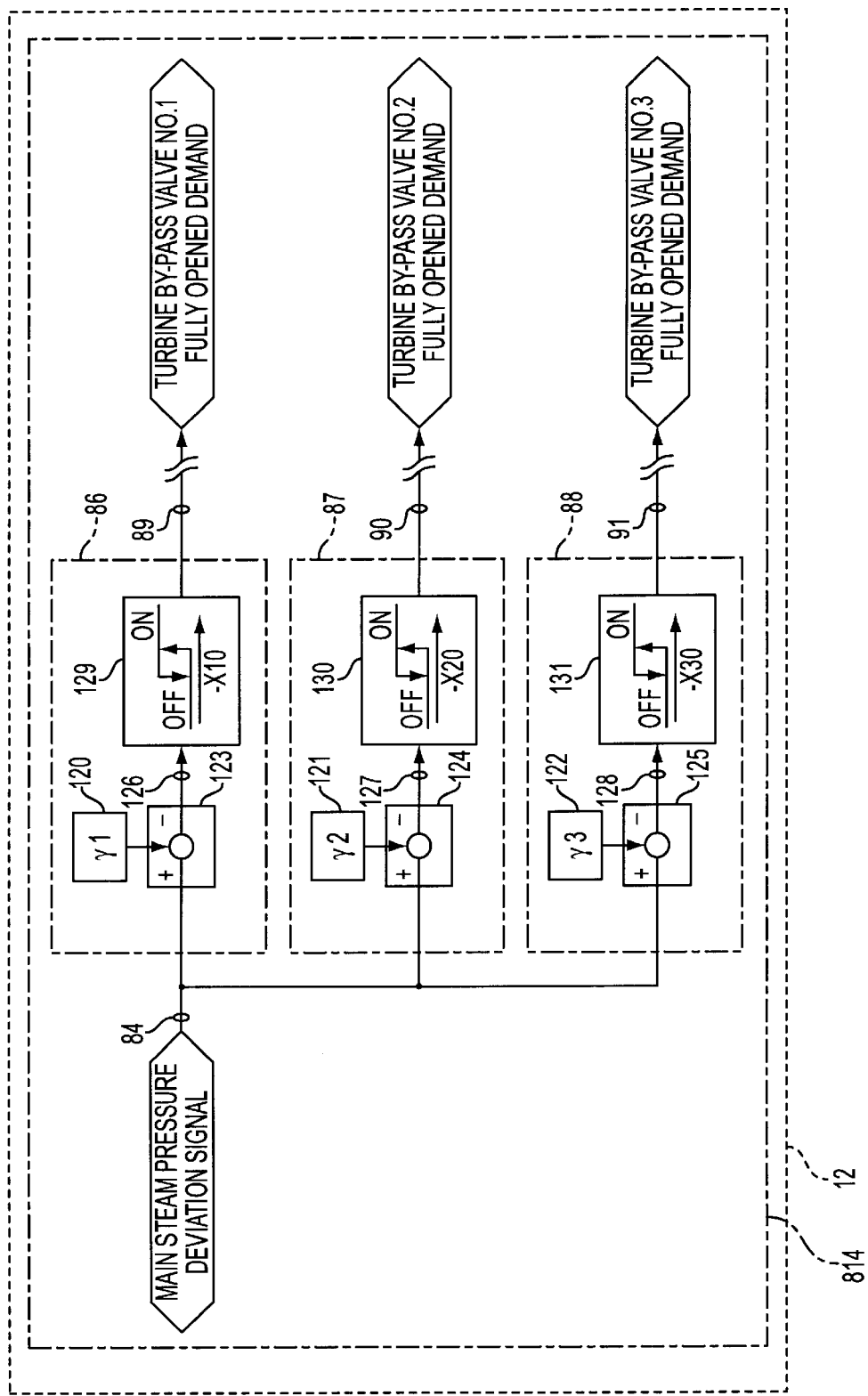
FIG. 16 is a block diagram showing signal decision units such as pressure detectors in FIG. 15.

FIG. 15 is a block diagram showing an ON-OFF controller 814 in the steam turbine controller for a nuclear power plant according to a seventh embodiment of the present invention, and FIG. 16 is a block diagram showing signal decision units such as pressure detectors 86, 87 and 88 in FIG. 15.

In the present embodiment, instead of the pressure detectors 58, 59 and 60 disposed upstream of the AND circuits 61a, 61b and 61c as shown in FIG. 13, the pressure detectors 86a, 87 and 88 are employed. Further, instead of the second medium value selector 64 between the main steam pressure detectors 2 and the pressure detectors 58, 59 and 60 in FIG. 13, a pressure detector 52 and a pressure detector 83 are employed. The pressure detector 83 accepts an output signal from the pressure detector 52 and a signal predetermined by the main steam pressure setter 82 and carries out a main steam pressure deviation signal 84. The main steam pressure deviation signal 84 thus calculated is input to the pressure detectors 86, 87 and 88.

As shown in FIG. 16, the pressure detector 86 includes a turbine by-pass valve pressure deviation calculation unit 123 and a turbine by-pass valve pressure comparator 129. The turbine by-pass valve pressure deviation calculation unit 123 accepts the main steam pressure deviation signal 84 and a signal (γ1) predetermined by the turbine by-pass valve pressure setter 120 and calculates a turbine by-pass valve pressure deviation signal 126. The turbine by-pass valve pressure comparator 129 accepts the pressure deviation signal 126 and outputs a pressure detector signal 89.

The pressure detector 87 and the pressure detector 88 have the same basic structure as the pressure detector 86 in the present embodiment.

The turbine by-pass valve pressure setters 120, 121 and 122 are preset such that pressure values γ1, γ2 and γ3 corresponding thereto have different values and let the turbine by-pass valve 7 open and close in a predetermined sequential manner. Thereby, a continuous pressure control can be made.

When the functions of the pressure detectors 86, 87 and 88 are to be recovered, disconnect margins X1, X2 and X3 can be set with respect to the predetermined values in order to avoid repeating operation around the predetermined values.

A self-holding circuit 251 in the ON-OFF controller 814 inputs a manual reset operation signal 57 from the manual reset operation means 56 (not shown in FIG. 15). Because the manual reset operation signal 57 is applied to the wipe out circuit 50 in the self-holding circuit 251, release of commands can be realized.

According to the seventh embodiment, unnecessary pressure control can be avoided by opening and closing required valves considering pressure increase and decrease thereof, and the valves can be controlled similarly to a regulating control depending on a pressure deviation signal. Furthermore, an operator can recover the system by using the manual reset operation means 56, after confirming a stable condition of the nuclear reactor.

Figure 17:
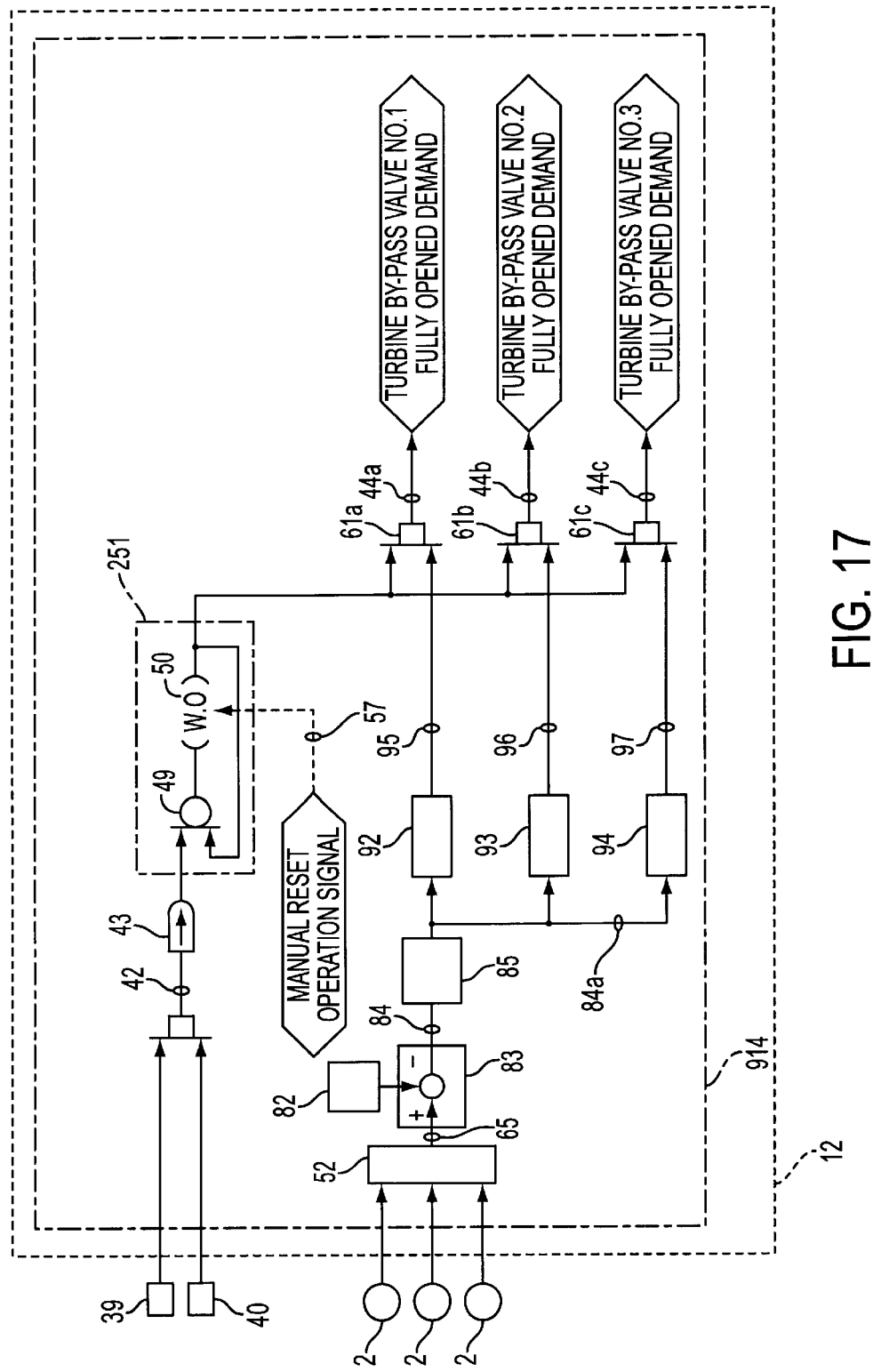
FIG. 17 is a block diagram showing an ON-OFF controller in the steam turbine controller for a nuclear power plant according to an eighth embodiment of the present invention.
Figure 18:
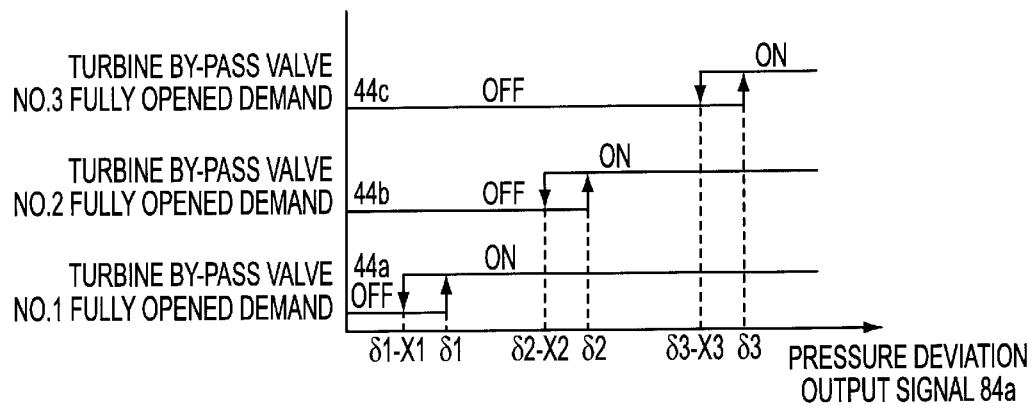
FIG. 18 is a chart for explaining advantages of the eighth embodiment.

FIG. 17 is a block diagram showing an ON-OFF controller 914 in the steam turbine controller for a nuclear power plant according to an eighth embodiment of the present invention, and FIG. 18 is a chart for explaining advantages of the eighth embodiment.

In the present embodiment, a pressure control calculating unit 85 and pressure control calculating output detectors 92, 93 and 94 replace the pressure deviation detectors 86, 87 and 88 disposed between the pressure deviation calculator 83 and the AND circuits 61a, 61b and 61c.

The pressure control calculating output detectors 92, 93 and 94 for detecting δ1, δ2 and δ3 detect that the output signals 84a, 84b and 84c from the pressure control calculating unit 85 are equal to or more than a predetermined value δ, and output signals 95, 96 and 97. These signals 95, 96 and 97 are compared to the output signal from the self-holding circuit 251 in AND circuits 61a, 61b and 61c, thereby outputting the turbine by-pass valve fully opened demand signals 44a, 44b and 44c to the corresponding turbine by-pass valves 7.

The pressure control calculating output detectors 92, 93 and 94 are preset such that detected values δ1, δ2 and δ3 corresponding thereto have different values and let the turbine by-pass valve 7 open and close in a predetermined sequential manner. Thereby, a continuous pressure control can be made. Further, the predetermined values δ1, δ2 and δ3 are set to 5%, 35% and 65%, for example. When the functions of the pressure control calculating output detectors 92, 93 and 94 are to be recovered, disconnect margins X1, X2 and X3 can be set with respect to the predetermined values in order to avoid unwanted operations around the predetermined values.

FIG. 18 shows the case where the turbine by-pass valve 7 is fully opened when the pressure deviation output signal 84a takes δ1, δ2 and δ3, and turbine by-pass valve 7 is fully closed when the pressure deviation output signal 84a takes δ1-X1, δ2-X2 and δ3-X3.

The self-holding circuit 251 in the ON-OFF controller 914 receives a manual reset operation signal 57 from the manual reset operation means 56 (not shown in FIG. 17). Because the manual reset operation signal 57 is applied to the wipe out circuit 50 in the self-holding circuit 251, release of commands can be realized.

According to the eighth embodiment, the turbine by-pass valve 7 can be opened and closed constantly by the same timing with respect to predetermined pressure values even if the predetermined pressure values are changed. Furthermore, an operator can recover the system by using the manual reset operation means 56, after confirming a stable condition of the nuclear reactor.

Figure 19:
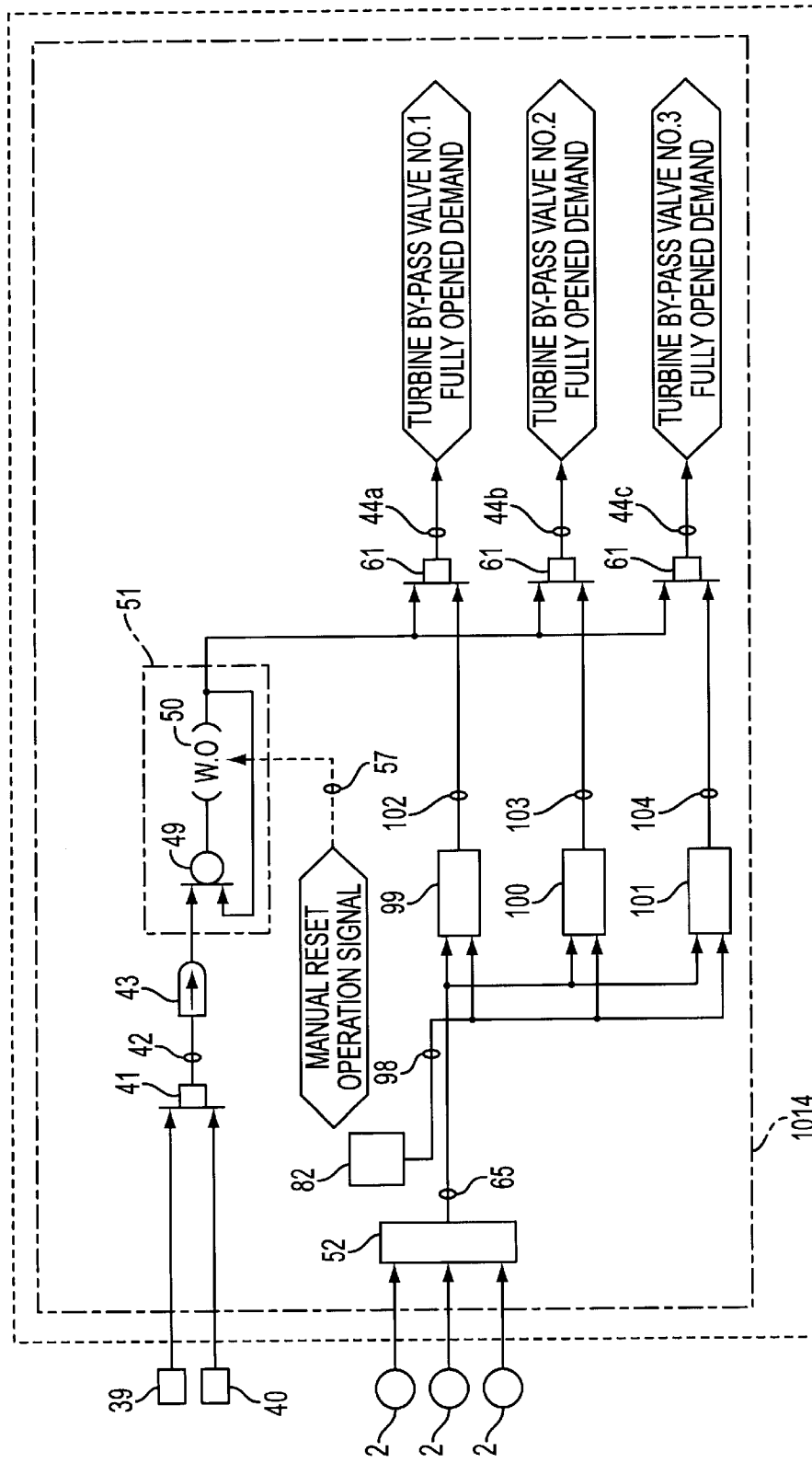
FIG. 19 is a block diagram showing an ON-OFF controller modifying the ON-OFF controller shown in FIG. 17.

FIG. 19 is a block diagram showing an ON-OFF controller 1014 modifying the ON-OFF controller 914 shown in FIG. 17. In FIG. 19, the pressure deviation calculator 83 and the pressure control calculator 85 are omitted. On the contrary, output signal 98 from the main steam pressure setter 82 as well as the main steam pressure signal 65 are sent to pressure detectors 102, 103 and 104, and output signals to the AND circuits 61a, 61b and 61c are generated. This modification results in similar effects to the embodiment shown in FIG. 17.

Figure 20:
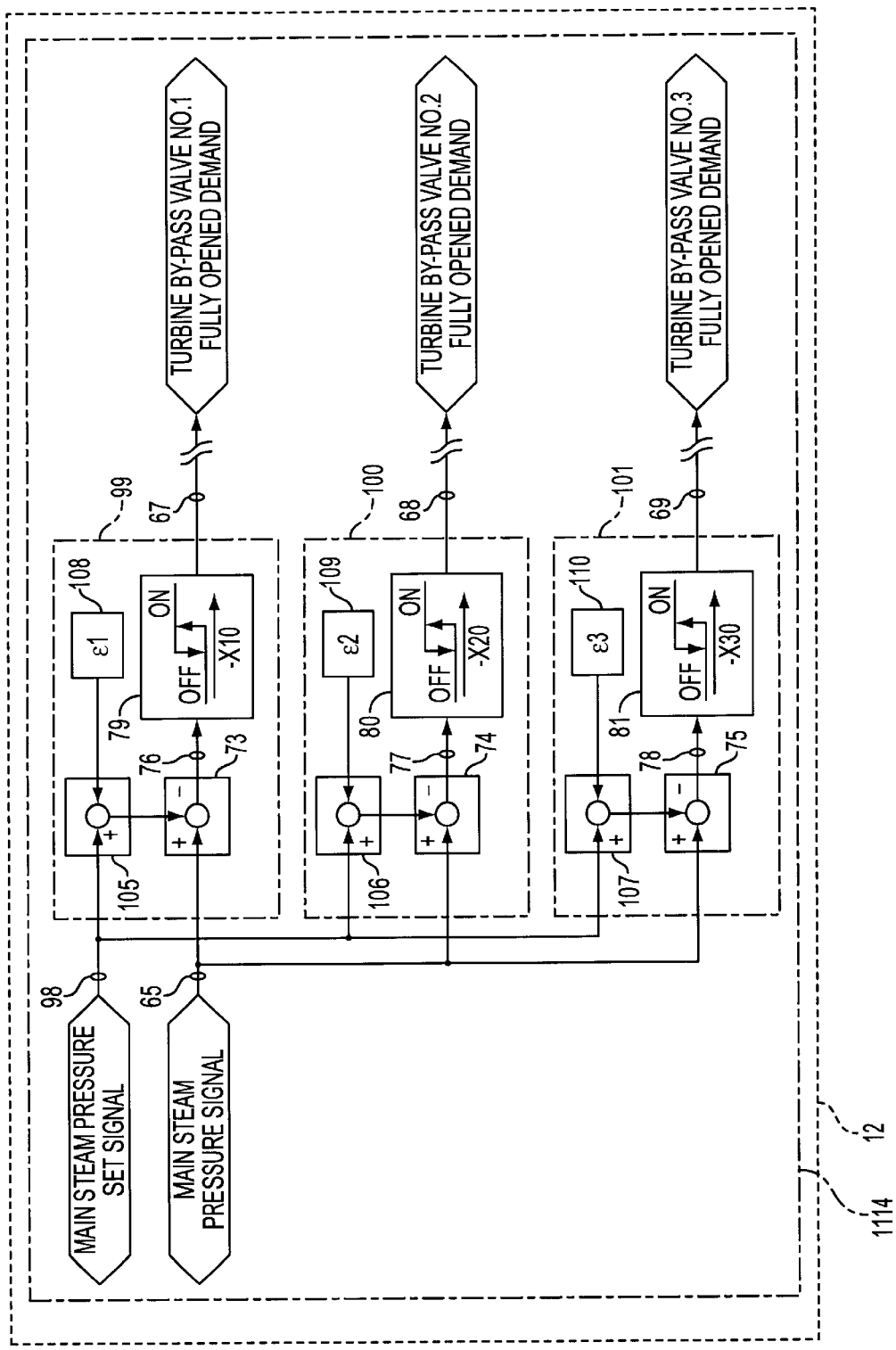
FIG. 20 is a block diagram showing an ON-OFF controller in the steam turbine controller for a nuclear power plant according to a ninth embodiment of the present invention.

FIG. 20 is a block diagram showing an ON-OFF controller 1114 in the steam turbine controller for a nuclear power plant according to a ninth embodiment of the present invention. In the present embodiment, pressure detectors 99, 100 and 101 replace the pressure detectors 70, 71 and 72 shown in FIG. 14.

Explaining about the pressure detector 99 for example, the system is constituted such that the main steam pressure setter signal 98 and a turbine by-pass valve pressure setter bias (ε1) 108 are input to a turbine by-pass valve pressure set adder 105, and the output from the turbine by-pass valve pressure set adder 105 is then entered to the pressure deviation calculator 73.

The pressure detector 100 and the pressure detector 101 have the same basic structure as the pressure detector 99 in the present embodiment.

According to the ninth embodiment, the turbine by-pass valve 7 can be opened and closed constantly by the same timing with respect to predetermined pressure values even if the predetermined pressure values are changed.

Figure 21:
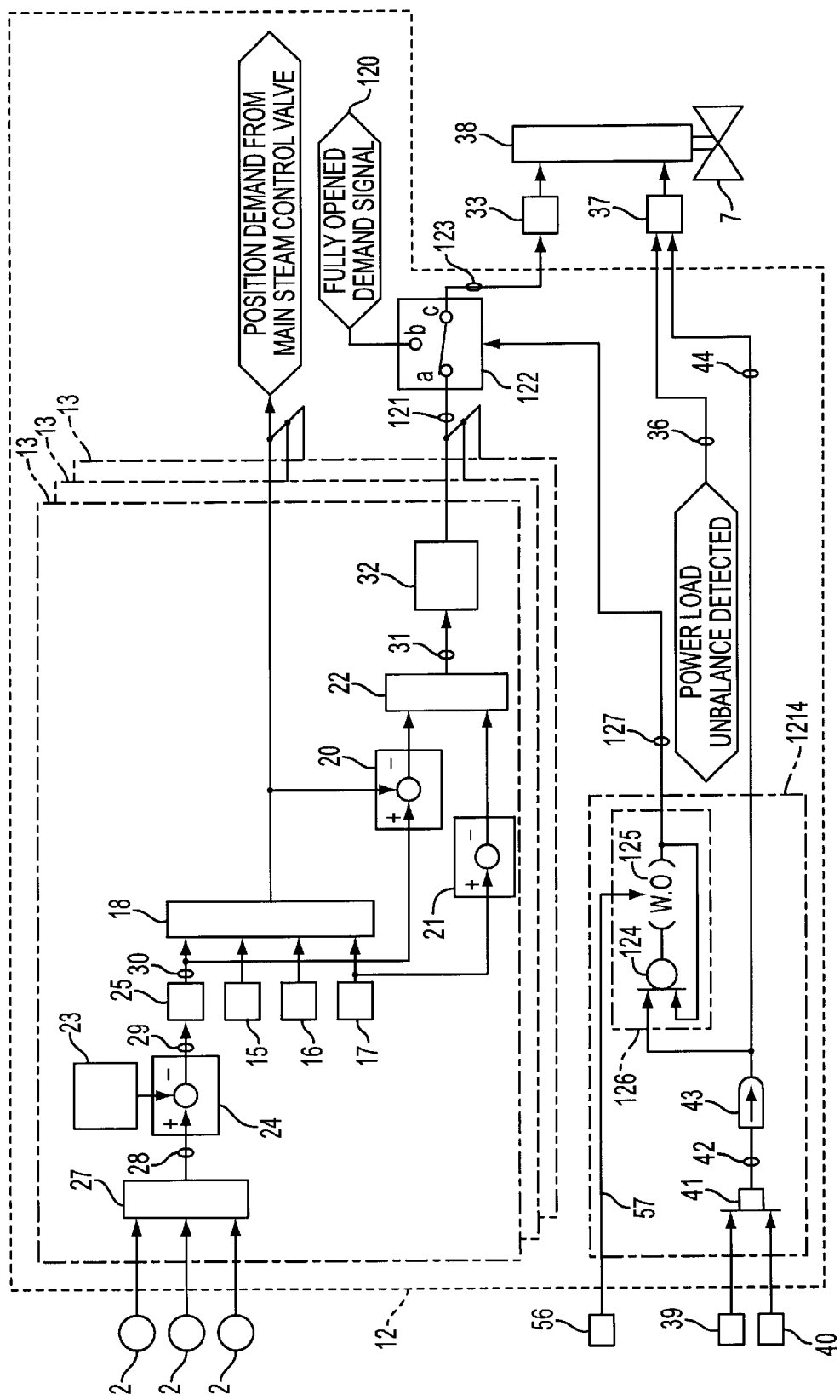
FIG. 21 is a block diagram showing an ON-OFF controller in the steam turbine controller for a nuclear power plant according to a tenth embodiment of the present invention.

FIG. 21 is a block diagram showing an ON-OFF controller 1214 in the steam turbine controller for a nuclear power plant according to a tenth embodiment of the present invention. In the present embodiment, a valve position demand signal changeover unit 122 is disposed between the servo valve 33 and the valve position control unit 32. A self-holding circuit 126 includes an OR circuit 124 and a wipe out circuit 125 and receives signals from the manual reset operation means 56 and the ON delay timer 43. The self-holding circuit 126 generates a valve position demand signal changeover signal 127 and sends that signal 127 to the valve position demand signal changeover unit 122. Either a turbine by-pass valve fully opened demand signal 212 from the valve position control unit 32 or a fully opened demand signal 120 is output to the servo valve 33 as a servo valve input signal 123.

The turbine by-pass valve fully opened demand signal 44 controls the fast acting solenoid valve 37 in FIG. 21. However, similarly to the first embodiment, the turbine by-pass valve fully opened demand signal 44 can be applied to control the servo valve 33 instead.

According to the present embodiment, the turbine by-pass valve fully opened demand signal 44 is input to the self-holding circuit 126 and the valve position demand changeover signal 127 is output. Connecting condition of the valve position demand signal changeover unit 122 is then changed from "a to c" condition to "b to c" condition. Therefore, the servo valve input signal 123 is replaced by the fully closed demand 120 from the turbine by-pass valve fully opened demand signal 121 used in the regular operating mode. A command signal from the self-holding circuit 126 can be released by the manual reset operation signal 57 from the manual reset operation means 56.

In a conventional system, the turbine by-pass valve 7 cannot be opened and closed by the fast acting solenoid valve 37 when the regulating controller 13 is under an unusual condition such as a malfunction or the like, even if the fast acting solenoid valve 37 is controlled based on the turbine by-pass valve fully opened demand signal 44. However, the present embodiment can realize full-opening and full-closing of the turbine by-pass valve 7 by means of inputting fully opened demand signal 120 as the servo valve input signal 123.

Figure 22:
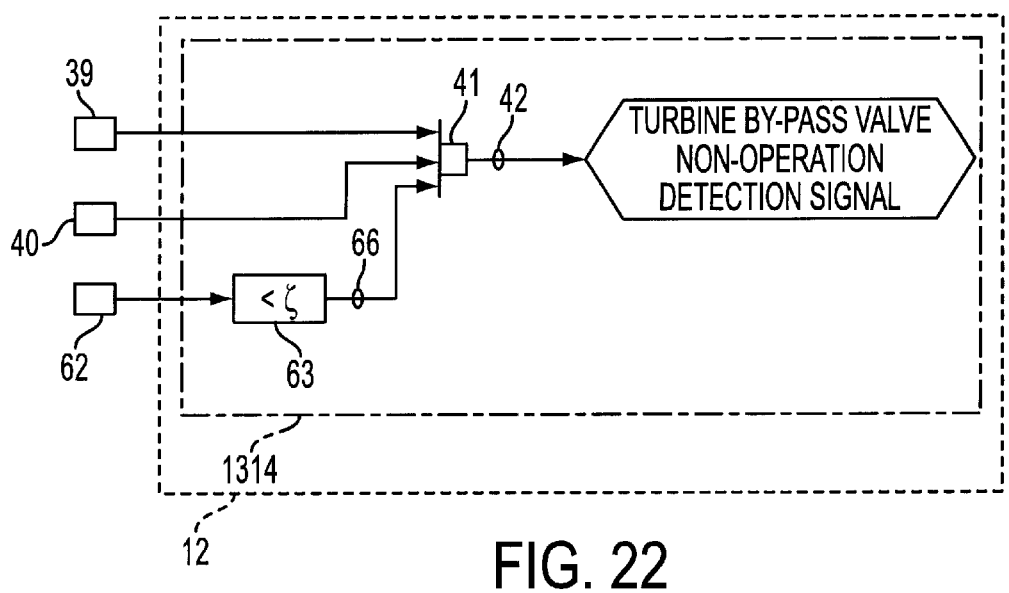
FIG. 22 is a block diagram showing an ON-OFF controller in the steam turbine controller for a nuclear power plant according to an eleventh embodiment of the present invention.

FIG. 22 is a block diagram showing an ON-OFF controller 1314 in the steam turbine controller for a nuclear power plant according to an eleventh embodiment of the present invention. In the ON-OFF controller 1314, a reactor power signal 62 is input to the ON-OFF controller 1314, and a signal decision unit 63 judges whether the output pressure of the reactor 1 is equal to or more than a predetermined value (ζ). If the detected-output pressure of the reactor 1 indicates that the turbine by-pass valve 7 has to be opened, the output signal 66 from the signal decision unit 63 is sent to the AND circuit 41 together with the detection signals from the turbine by-pass valve fully closed position detector 39 and the turbine trip detector 40 and thereby the turbine by-pass valve non-operation detection signal 42 is generated.

As the reactor power signal 62, an output signal from an adjusting unit of the nuclear reactor, a discharge signal of the feeding water, a discharge signal of the main steam, an output signal from the generator, a pressure signal from a first stage pressure of the steam turbine and the like of a nuclear power plant can be applied.

According to the present embodiment, opening operation of the turbine by-pass valve 7 can be restrained under the condition where output energy is relatively low and opening operation of the turbine by-pass valve 7 is not required.

Figure 23:
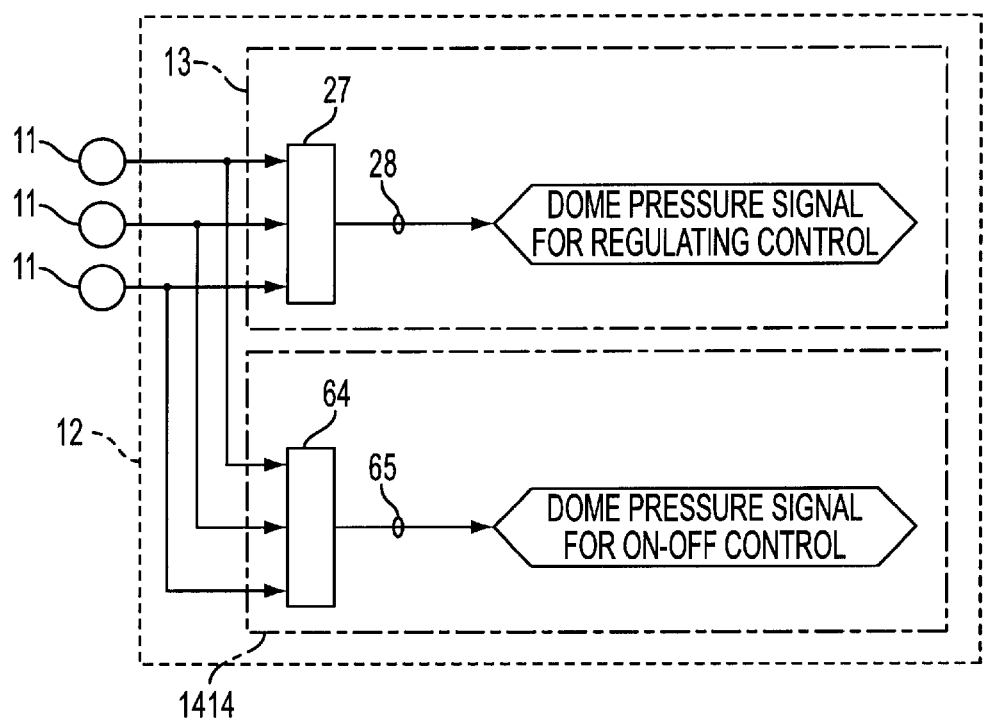
FIG. 23 is a block diagram showing an ON-OFF controller in the steam turbine controller for a nuclear power plant according to a twelfth embodiment of the present invention.

FIG. 23 is a block diagram showing an ON-OFF controller 1414 in the steam turbine controller for a nuclear power plant according to a twelfth embodiment of the present invention. In the twelfth embodiment, pressure signals from the reactor dome pressure detector 11 which indicate pressure inside the nuclear reactor 1 are employed instead of the main steam pressure signal s 2 in FIG. 3. Thus, the pressure signal 28 and the ON-OFF control pressure signal 65 are generated.

According to the present embodiment, rapid pressure increase of the nuclear reactor 1 can be restrained in a nuclear power plant having the reactor dome pressure detector 11, as well as a nuclear power plant having the main steam pressure detector 2.

The foregoing discussion discloses and describes merely a number of exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting, of the scope of the invention, which is set forth in the following claims. Thus, the present invention may be embodied in various ways within the scope of the spirit of the invention.

Especially, the above-explained elements such as speed/load control calculating unit 15, load limiter 16, maximum discharge restriction unit 17, first low value selector 18, first deviation calculating unit 20, second deviation calculating unit 21, second low value selector 22, main steam pressure setter 23, first pressure deviation calculating unit 24, pressure control calculating unit 25, first medium value selector 27, AND calculator 41, OR calculator, wipe out circuit 50, self-holding circuit 51, pressure detector 52, wipe out circuit 54, one-shot circuit 55, manual reset operation means 56, pressure detector 58, pressure detector 59, pressure detector 60, AND circuit, pressure deviation switch 63, second medium value selector 64, turbine by-pass valve pressure setters 70, 71 and 72, turbine by-pass valve No.1 pressure deviation calculators 73, 74 and 75, turbine by-pass valve No.1 pressure comparators 79, 80 and 81, main steam pressure setter 82, pressure deviation calculator 83, pressure control calculating unit 85, pressure deviation switches 86, 87 and 88, pressure control calculating output detectors 92, 93 and 94, pressure detectors 99, 100 and 101, turbine by-pass valve pressure set adders 105, 106 and 107, turbine by-pass valve pressure deviation calculators 111, 112 and 113, turbine by-pass valve pressure comparators 117, 118 and 119, valve position demand signal changeover unit 122, OR circuit 124, wipe out circuit 125, self-holding circuit 126 and the like are not limited to be constituted as hardware; these elements can be stored in a memory or a part of a CPU (Central Processing Unit), which can read data from the memory and calculate for the following processes, or the like.

The same function can be realized by installing programs into a computer.

Optical disks such as a DVD, a MO or a CD-ROM, magnetic disks such as a floppy disk and a hard drive disk, and other storage devices including a semiconductor memory can, be applied for installing the functions.

Further, multiplex regulating controllers 13 are employed in the embodiments; however, same advantages can be expected if a single regulating controller 13 is applied.

As described above in detail, the present invention makes it possible to provide a nuclear power plant capable of avoiding a rapid increase of pressure in the nuclear reactor even if the function of the turbine by-pass valve is lost.

The entire contents of Japanese Patent Application P2000-108622, filed Apr. 10, 2000, are incorporated herein by reference.

What is claimed is:

1. A nuclear power plant having a nuclear reactor, comprising:
   a first steam supply system connected between the nuclear reactor and a steam turbine,
   a second steam supply system branched from the first steam supply system and connected downstream of the steam turbine,
   a first valve in the first steam supply system for adjusting steam pressure to the steam turbine,
   a second valve in the second steam supply system for adjusting branched steam pressure,
   a first controller that generates a first control signal for the first valve and a second control signal for the second valve, and
   a second controller that generates a third control signal for the second valve, the third control signal having priority over the second control signal;
   and two controlling valves operating independently from one another, wherein said second valve is configured to be operated by at least one of said two controlling valves.

2. A nuclear power plant, according to claim 1, wherein each of said two controlling valves are controlled by a different control signal.

3. A nuclear power plant, according to claim 1, wherein said two controlling valves comprise a servo valve and a fast acting solenoid valve.

4. A nuclear power plant, according to claim 3, wherein said servo valve is controlled by said second control signal and wherein said fast acting solenoid valve is controlled by said third control signal.

5. A nuclear power plant, according to claim 3, wherein said fast acting solenoid valve controls operation of said second valve when said servo valve is malfunctioning.

6. The nuclear power plant according to claim 1, wherein the third control signal is generated if the second valve is closed and the pressure in the steam turbine decreases.

7. The nuclear power plant according to claim 1, wherein the third control signal includes an opening signal for the second valve.

8. The nuclear power plant according to claim 7, wherein the third signal is generated if the second valve is closed within a predetermined time period after receiving the second signal.

9. The nuclear power plant according to claim 7, wherein the third signal is released if the second valve is opened within a predetermined time period after receiving the third signal.

10. The nuclear power plant according to claim 1, wherein the second valve is multiplexed, and each second valve accepts the second signal and the third signal.

11. The nuclear power plant according to claim 7, wherein the third signal is released if the steam pressure from the nuclear reactor is a predetermined value.

12. The nuclear power plant according to claim 6, wherein the third signal is generated only once.

13. The nuclear power plant according to claim 1, wherein the third control signal is generated at least when the plant is not in regular operating mode.

14. The nuclear power plant according to claim 1, wherein the third control signal acts to avoid that both the first valve and the second valve are closed.

* * * * *